United States Patent
Endo et al.

(10) Patent No.: US 7,980,990 B2
(45) Date of Patent: Jul. 19, 2011

(54) POWER OUTPUT APPARATUS, VEHICLE INCLUDING POWER OUTPUT APPARATUS, AND CONTROL UNIT AND METHOD FOR POWER OUTPUT APPARATUS

(75) Inventors: Hiroatsu Endo, Nagoya (JP); Masashi Yoshimi, Toyota (JP); Kazuo Kawaguchi, Kasugai (JP); Shinichi Sasade, Nagoya (JP); Yoichi Tajima, Anjyo (JP); Shinobu Nishiyama, Toyoake (JP); Kazuomi Okasaka, Nagoya (JP)

(73) Assignees: Toyota Jidosha Kabushiki Kaisha, Aichi-ken (JP); Aisin AW Co., Ltd., Aichi-ken (JP)

( * ) Notice: Subject to any disclaimer, the term of this patent is extended or adjusted under 35 U.S.C. 154(b) by 856 days.

(21) Appl. No.: 11/993,692

(22) PCT Filed: Jan. 10, 2007

(86) PCT No.: PCT/IB2007/000067
§ 371 (c)(1),
(2), (4) Date: Dec. 21, 2007

(87) PCT Pub. No.: WO2007/088429
PCT Pub. Date: Aug. 9, 2007

(65) Prior Publication Data
US 2010/0081539 A1    Apr. 1, 2010

(30) Foreign Application Priority Data
Feb. 1, 2006   (JP) .................................. 2006-024801

(51) Int. Cl.
*B60W 10/06* (2006.01)
*B60W 10/10* (2006.01)

(52) U.S. Cl. ............................................ 477/3; 477/906
(58) Field of Classification Search .................. 903/930
See application file for complete search history.

(56) References Cited

U.S. PATENT DOCUMENTS
5,697,466 A    12/1997 Moroto et al.
(Continued)

FOREIGN PATENT DOCUMENTS
JP    4-347053 A    12/1992
JP    11-108173 A    4/1999
JP    2003-83442 A    3/2003
(Continued)

OTHER PUBLICATIONS
Japanese Office Action issued on Aug. 10, 2010 in corresponding Japanese Patent Application No. 2006-024801.

*Primary Examiner* — Edwin A Young
(74) *Attorney, Agent, or Firm* — Sughrue Mion, PLLC

(57) ABSTRACT

When there is no malfunction in either drive shaft rotational speed detection portion (36) or rotating shaft rotational speed detection portion (44), control of internal combustion engine (22), the power split device (30, MG1), the electric motor (MG2), and the shifting portion (60) is performed while speed ratio in shifting portion (60) is changed and an intermittent operation of internal combustion engine (22) is performed so that a drive power required for drive shaft (32a) is output to shaft (32a). When a malfunction occurs in drive shaft rotational speed detection portion (36) or/and rotating shaft rotational speed detection portion (44), the control is performed while at least one of change in speed ratio, intermittent operation, and output of drive power required for shaft (32a) to shaft (32a) is limited so that a drive power that approximates required drive power as closely as possible is output to drive shaft (32a).

9 Claims, 11 Drawing Sheets

U.S. PATENT DOCUMENTS

| | | | |
|---|---|---|---|
| 5,873,426 A | 2/1999 | Tabata et al. | |
| 6,248,036 B1* | 6/2001 | Masaki | 475/2 |
| 2003/0078134 A1 | 4/2003 | Kojima et al. | |
| 2004/0249524 A1* | 12/2004 | Ozeki et al. | 701/22 |
| 2006/0289210 A1* | 12/2006 | Yoshimi | 180/65.2 |

FOREIGN PATENT DOCUMENTS

| | | |
|---|---|---|
| JP | 2004-255901 A | 9/2004 |
| JP | 2004-278713 A | 10/2004 |
| JP | 2005-172101 A | 6/2005 |
| JP | 2006-250269 A | 9/2006 |

* cited by examiner

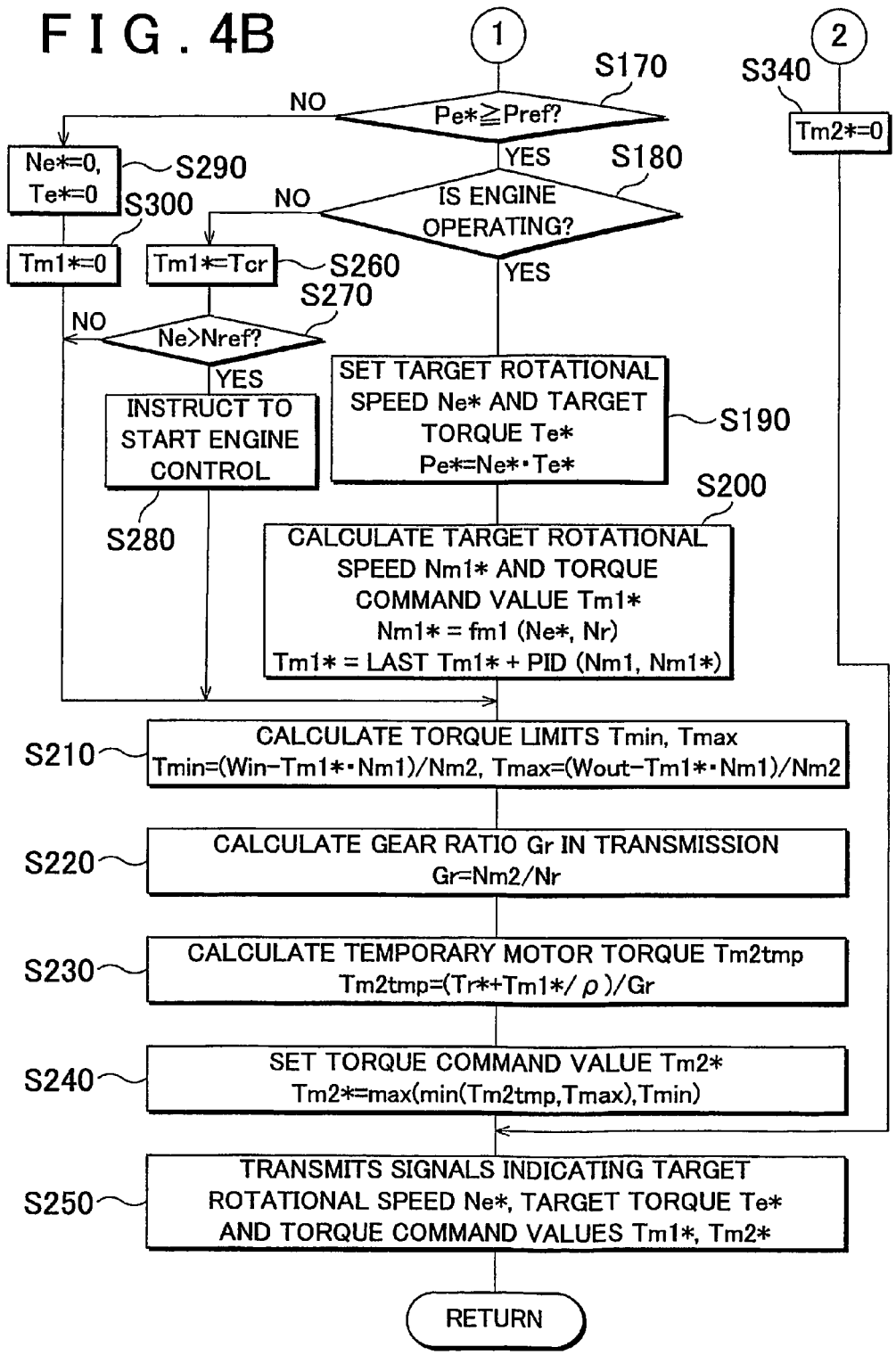

POWER OUTPUT APPARATUS, VEHICLE INCLUDING POWER OUTPUT APPARATUS, AND CONTROL UNIT AND METHOD FOR POWER OUTPUT APPARATUS

BACKGROUND OF THE INVENTION

1. Field of the Invention

The invention relates to a power output apparatus, a vehicle including the power output apparatus, and a control unit and method for the power output apparatus.

2. Description of the Related Art

For example, Japanese Patent Application Publication No. JP-A-2004-255901 describes a power output apparatus mounted in a vehicle. In the power output apparatus, a first motor, an engine, and an output shaft connected to wheels are connected to a sun gear, a carrier, and a ring gear of a planetary gear set, respectively, and a second motor is connected to the output shaft via a transmission that includes two brakes. When the engine of the described vehicle is started while the vehicle is at a standstill, the engine is cranked by the first motor with a reaction torque output to the output shaft while the two brakes are both applied to fix the rotational speed of the output shaft to zero. Thus, the vehicle is prevented from moving when the engine is started.

Some of such power output apparatuses make, based on the rotational speed of the output shaft and the rotational speed of the second motor, a synchronous determination for smoothly changing the gears of the transmission and a determination as to whether the second motor and the output shaft are disconnected from each other, that is, whether the both brakes of the transmission are released. If a malfunction occurs in a sensor that detects the rotational speed of the output shaft or a sensor that detects the rotational speed of the second motor, the synchronous determination and the determination as to whether the second motor and the output shaft are disconnected from each other may not be made appropriately. In such a case, the components of the transmission, such as the brake, may wear out because the gears of the transmission cannot be changed smoothly. The rotational speed of the output shaft may change unexpectedly, because the engine is cranked by the first motor with the reaction torque output to the output shaft while the second motor and the output shaft are disconnected from each other. The rotational speed of the second motor may abruptly increase because the torque is output from the second motor while the second motor and the output shaft are disconnected from each other. However, such inconvenience should be minimized.

SUMMARY OF THE INVENTION

The invention suppresses wearing-out of the components of a transmission, when a malfunction occurs in at least one of a drive shaft rotational speed sensor, which detects the rotational speed of a drive shaft, and a rotating shaft rotational speed sensor, which detects the rotational speed of a rotating shaft. The invention also suppresses unexpected changes in the rotational speed of the drive shaft, when a malfunction occurs in at least one of the drive shaft rotational speed sensor and the rotating shaft rotational speed sensor. Furthermore, the invention suppresses abrupt increases in the rotational speed of the rotating shaft, when a malfunction occurs in at least one of the drive shaft rotational speed sensor and the rotating shaft rotational speed sensor.

The following configurations are employed for the power output apparatus, the vehicle including the power output apparatus, and the control unit and method for controlling the power output apparatus.

A first aspect of the invention relates to a power output apparatus that outputs power to a drive shaft. The power output apparatus includes an internal combustion engine; storage means; an electric motor that receives and outputs power, and that exchanges electric power with the storage means; power split means that is connected to an output shaft of the internal combustion engine and the drive shaft, and that receives power from the output shaft and outputs the power to the drive shaft or receives power from the drive shaft and outputs the power to the output shaft while exchanging electric power with the storage means and exchanging power with the internal combustion engine; shifting means for transferring power between a rotating shaft of the electric motor and the drive shaft while changing the speed ratio based on the rotational speed of the rotating shaft of the electric motor and the rotational speed of the drive shaft; drive shaft rotational speed detection means for detecting the rotational speed of the drive shaft; rotating shaft rotational speed detection means for detecting the rotational speed of the rotating shaft of the electric motor; required drive power setting means for setting a required drive power required for the drive shaft; and control means. When there is no malfunction in either the drive shaft rotational speed detection means or the rotating shaft rotational speed detection means, the control means controls the internal combustion engine, the power split means, the electric motor, and the shifting means while making a change in the speed ratio in the shifting means and performing an intermittent operation of the internal combustion engine so that a drive power corresponding to the required drive power is output to the drive shaft. However, when a malfunction occurs in at least one of the drive shaft rotational speed detection means and the rotating shaft rotational speed detection means, the control means controls the internal combustion engine, the power split means, the electric motor, and the shifting means while limiting at least one of the change in the speed ratio in the shifting means, the intermittent operation of the internal combustion engine, and the output of the required drive power to the drive shaft so that a drive power that approximates the required drive power as closely as possible is output to the drive shaft.

With the power output apparatus according to the first aspect of the invention, when there is no malfunction in either the drive shaft rotational speed detection means for detecting the rotational speed of the drive shaft or the rotating shaft rotational speed detection means for detecting the rotational speed of the rotating shaft of the electric motor, the internal combustion engine, the power split means, the electric motor, and the shifting means are controlled while the speed ratio is changed in the shifting means, for transferring power between the rotating shaft and the drive shaft while changing the speed ratio based on the rotational speed of the rotating shaft and the rotational speed of the drive shaft, and an intermittent operation of the internal combustion engine is performed so that the drive power corresponding to the required drive power is output to the drive shaft. On the other hand, when a malfunction occurs, that is when a malfunction occurs in at least one of the drive shaft rotational speed detection means and the rotating shaft rotational speed detection means, the internal combustion engine, the power split means, the electric motor, and the shifting means are controlled while at least one of the change in the speed ratio in the shifting means, the intermittent operation of the internal combustion engine, and the output of the required drive power to the drive shaft is limited so that a drive power that approximates the required drive power as closely as possible is output to the drive shaft. Namely, when a malfunction occurs, at least one of the change in the speed ratio in the shifting means, the intermittent operation of the internal combustion engine, and the output of the required drive power to the drive shaft is limited. Thus, it is possible to suppress wearing out of the components of the shifting means, and unexpected changes in the rotational speed of the drive shaft when a malfunction occurs. Also, even when a malfunction occurs, a drive power that approximates the required drive power as closely as possible is output to the drive shaft.

In the power output apparatus according to the first aspect of the invention, when a malfunction occurs in the drive shaft rotational speed detection means and the drive shaft rotational speed detection means cannot detect the rotational speed of the drive shaft properly, the control means may determine that a malfunction occurs and performs control.

In the power output apparatus according to the first aspect of the invention, when a malfunction occurs, the control means may perform control so that the speed ratio in the shifting means is not changed. Thus, it is possible to suppress wearing-out of the components of the shifting means, which is caused by changing the speed ratio when a synchronous determination for smoothly changing the speed ratio in the shifting means cannot be made appropriately.

In the power output apparatus according to the first aspect of the invention, when a malfunction occurs, the control means may perform control so that the intermittent operation of the internal combustion engine is not performed. The shifting means may be able to change the speed ratio and disconnect the rotating shaft of the electric motor and the drive shaft from each other by changing the engagement/disengagement states of multiple clutches, and include disconnection determination means for determining whether the rotating shaft of the electric motor and the drive shaft are disconnected from each other based on the rotational speed of the rotating shaft detected by the rotating shaft rotational speed detection means and the rotational speed of the drive shaft detected by the drive shaft rotational speed detection means. The power split means may be able to drive the internal combustion engine with an output of a reaction force to the drive shaft. In this case, when a malfunction occurs, the determination as to whether the rotating shaft of the electric motor and the drive shaft are disconnected from each other cannot be made appropriately based on the rotational speed of the rotating shaft and the rotational speed of the drive shaft. However, the control is performed so that the intermittent operation of the internal combustion engine is not performed. Thus, performing the control so that the intermittent operation of the internal combustion engine is not performed makes it possible to suppress driving of the internal combustion engine using the power split means with the output of the reaction force to the drive shaft while the rotating shaft of the electric motor and the drive shaft are disconnected from each other. As a result, it is possible to suppress unexpected changes in the rotational speed of the drive shaft. The term "clutch" includes a clutch that connects one rotational element to a non-rotational element such as a case as well as a commonly used clutch that connects two rotational elements to each other.

In the power output apparatus according to the first aspect of the invention, when a malfunction occurs, the control means may limit the drive power output from the electric motor. The shifting means may be able to change the speed ratio and disconnect the rotating shaft of the electric motor and the drive shaft from each other by changing the engagement/disengagement states of multiple clutches, and include disconnection determination means for determining whether the rotating shaft of the electric motor and the drive shaft are disconnected from each other based on the rotational speed of the rotating shaft detected by the rotating shaft rotational speed detection means and the rotational speed of the drive shaft detected by the drive shaft rotational speed detection means. In this case, when a malfunction occurs, the determination as to whether the rotating shaft of the electric motor and the drive shaft are disconnected from each other cannot be made appropriately based on the rotational speed of the rotating shaft and the rotational speed of the drive shaft. However, the control is performed so that the drive power output from the electric motor is limited. Thus, it is possible to suppress output of large drive power from the electric motor while the rotating shaft of the electric motor and the drive shaft are disconnected from each other. As a result, it is possible to suppress abrupt increases in the rotational speed of the rotating shaft.

In the power output apparatus according to the first aspect of the invention, the power split means may include three-axis power reception/output means that is connected to three shafts which are the output shaft of the internal combustion engine, the drive shaft, and a third shaft, and that receives or outputs, based on the power received from and/or output to any two of the three shafts, power from or to the remaining shaft; and an electric motor that receives power from and outputs power to the third shaft.

A second aspect of the invention relates to a vehicle provided with the power output apparatus according to any one of the above-described forms of the first aspect of the invention. In the vehicle, an axle is connected to the drive shaft. Basically, the vehicle according to the second aspect of the invention is provided with the power output apparatus that outputs power to the drive shaft, and that includes an internal combustion engine; storage means; an electric motor that receives and outputs power, and that exchanges electric power with the storage means; power split means that is connected to an output shaft of the internal combustion engine and the drive shaft, and that receives power from the output shaft and outputs the power to the drive shaft or receives power from the drive shaft and outputs the power to the output shaft while exchanging electric power with the storage means and exchanging power with the internal combustion engine; shifting means for transferring power between a rotating shaft of the electric motor and the drive shaft while changing the speed ratio based on the rotational speed of the rotating shaft of the electric motor and the rotational speed of the drive shaft; drive shaft rotational speed detection means for detecting the rotational speed of the drive shaft; rotating shaft rotational speed detection means for detecting the rotational speed of the rotating shaft of the electric motor; required drive power setting means for setting a required drive power required for the drive shaft; and control means. When there is no malfunction in either the drive shaft rotational speed detection means or the rotating shaft rotational speed detection means, the control means controls the internal combustion engine, the power split means, the electric motor, and the shifting means while making a change in the speed ratio in the shifting means and performing an intermittent operation of the internal combustion engine so that a drive power corresponding to the required drive power is output to the drive shaft. When a malfunction occurs in at least one of the drive shaft rotational speed detection means and the rotating shaft rotational speed detection means, the control means controls the internal combustion engine, the power split means, the electric motor, and the shifting means while limiting at least one of the change in the speed ratio in the shifting means, the intermittent operation of the internal combustion engine, and the output of the required drive power to the drive shaft so that a drive power that approximates the required drive power as closely as possible is output to the drive shaft.

In the vehicle according to the second aspect of the invention, the same effects as those produced by the power output apparatus according to the first aspect of the invention can be obtained, because the vehicle is provided with the power output apparatus according to any one of the forms of the first aspect of the invention. For example, it is possible to suppress wearing-out of the components of the shifting means and unexpected changes in the rotational speed of the drive shaft, when a malfunction occurs.

A third aspect of the invention relates to a control unit for a power output apparatus that includes an internal combustion engine; storage means; an electric motor that receives and outputs power, and that exchanges electric power with the storage means; power split means that is connected to an output shaft of the internal combustion engine and the drive shaft, and that receives power from the output shaft and outputs the power to the drive shaft or receives power from the drive shaft and outputs the power to the output shaft while exchanging electric power with the storage means and exchanging power with the internal combustion engine; shifting means for transferring power between a rotating shaft of the electric motor and the drive shaft while changing a speed ratio based on the rotational speed of the rotating shaft of the electric motor and the rotational speed of the drive shaft; drive shaft rotational speed detection means for detecting the rotational speed of the drive shaft; and rotating shaft rotational speed detection means for detecting the rotational speed of the rotating shaft of the electric motor. The control unit includes required drive power setting means for setting a required drive power required for the drive shaft; and control means. When there is no malfunction in either the drive shaft rotational speed detection means or the rotating shaft rotational speed detection means, the control means controls the internal combustion engine, the power split means, the electric motor, and the shifting means while making a change in the speed ratio in the shifting means and performing an intermittent operation of the internal combustion engine so that a drive power corresponding to the required drive power is output to the drive shaft. When a malfunction occurs in at least one of the drive shaft rotational speed detection means and the rotating shaft rotational speed detection means, the control means controls the internal combustion engine, the power split means, the electric motor, and the shifting means while limiting at least one of the change in the speed ratio in the shifting means, the intermittent operation of the internal combustion engine, and the output of the required drive power to the drive shaft so that a drive power that approximates the required drive power as closely as possible is output to the drive shaft.

With the control unit according to the third aspect of the invention, when there is no malfunction in either the drive shaft rotational speed detection means for detecting the rotational speed of the drive shaft or the rotating shaft rotational speed detection means for detecting the rotational speed of the rotating shaft of the electric motor, the internal combustion engine, the power split means, the electric motor, and the shifting means are controlled while the speed ratio is changed in the shifting means, for transferring power between the rotating shaft and the drive shaft while changing the speed ratio based on the rotational speed of the rotating shaft and the rotational speed of the drive shaft, and an intermittent operation of the internal combustion engine is performed so that the drive power corresponding to the required drive power is output to the drive shaft. On the other hand, when a malfunction occurs in at least one of the drive shaft rotational speed detection means and the rotating shaft rotational speed detection means, the internal combustion engine, the power split means, the electric motor, and the shifting means are controlled while at least one of the change in the speed ratio in the shifting means, the intermittent operation of the internal combustion engine, and the output of the required drive power to the drive shaft is limited so that a drive power that approximates the required drive power as closely as possible is output to the drive shaft. Namely, when a malfunction occurs, at least one of the change in the speed ratio in the shifting means, the intermittent operation of the internal combustion engine, and the output of the required drive power to the drive shaft is limited. Thus, it is possible to suppress wearing out of the components of the shifting means, and unexpected changes in the rotational speed of the drive shaft when a malfunction occurs. Also, even when a malfunction occurs, a drive power that approximates the required drive power as closely as possible is output to the drive shaft.

A fourth aspect of the invention relates to a control method for a power output apparatus that includes an internal combustion engine; storage means; an electric motor that receives and outputs power, and that exchanges electric power with the storage means; power split means that is connected to an output shaft of the internal combustion engine and the drive shaft, and that receives power from the output shaft and outputs the power to the drive shaft or receives power from the drive shaft and outputs the power to the output shaft while exchanging electric power with the storage means and exchanging power with the internal combustion engine; shifting means for transferring power between a rotating shaft of the electric motor and the drive shaft while changing a speed ratio based on the rotational speed of the rotating shaft of the electric motor and the rotational speed of the drive shaft; drive shaft rotational speed detection means for detecting the rotational speed of the drive shaft; and rotating shaft rotational speed detection means for detecting the rotational speed of the rotating shaft of the electric motor. According to the control method, when there is no malfunction in either the drive shaft rotational speed detection means or the rotating shaft rotational speed detection means, the internal combustion engine, the power split means, the electric motor, and the shifting means are controlled while change in the speed ratio in the shifting means is made and an intermittent operation of the internal combustion engine is performed so that a drive power required for the drive shaft is output to the drive shaft. On the other hand, when a malfunction occurs in at least one of the drive shaft rotational speed detection means and the rotating shaft rotational speed detection means, the internal combustion engine, the power split means, the electric motor, and the shifting means are controlled while at least one of the change in the speed ratio in the shifting means, the intermittent operation of the internal combustion engine, and the output of the drive power required for the drive shaft to the drive shaft is limited so that a drive power that approximates the required drive power as closely as possible is output to the drive shaft.

With the control method according to the fourth aspect of the invention, when there is no malfunction in either the drive shaft rotational speed detection means for detecting the rotational speed of the drive shaft or the rotating shaft rotational speed detection means for detecting the rotational speed of the rotating shaft of the electric motor, the internal combustion engine, the power split means, the electric motor, and the shifting means are controlled while the speed ratio is changed in the shifting means to transfer power between the rotating shaft and the drive shaft while changing the speed ratio based on the rotational speed of the rotating shaft and the rotational speed of the drive shaft, and an intermittent operation of the internal combustion engine is performed so that the drive power corresponding to the required drive power is output to the drive shaft. On the other hand, when a malfunction occurs in at least one of the drive shaft rotational speed detection means and the rotating shaft rotational speed detection means, the internal combustion engine, the power split means, the electric motor, and the shifting means are controlled while at least one of the change in the speed ratio in the shifting means, the intermittent operation of the internal combustion engine, and the output of the required drive power to the drive shaft is limited so that a drive power that approximates the required drive power as closely as possible is output to the drive shaft. Namely, when a malfunction occurs, at least one of the change in the speed ratio in the shifting means, the intermittent operation of the internal combustion engine, and the output of the required drive power to the drive shaft is limited. Thus, it is possible to suppress wearing out of the components of the shifting means, and unexpected changes in the rotational speed of the drive shaft when a malfunction occurs. Also, even when a malfunction occurs, a drive power that approximates the required drive power as closely as possible is output to the drive shaft.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein:

FIGS. 4A and 4B are the flowcharts showing an example of the drive control routine performed by an electronic control unit 70 mounted in the hybrid vehicle 20 according to the embodiment of the invention;

DETAILED DESCRIPTION OF THE EXAMPLE EMBODIMENT

Hereafter, an example embodiment of the invention will be described with reference to accompanying drawings.

Figure 1:
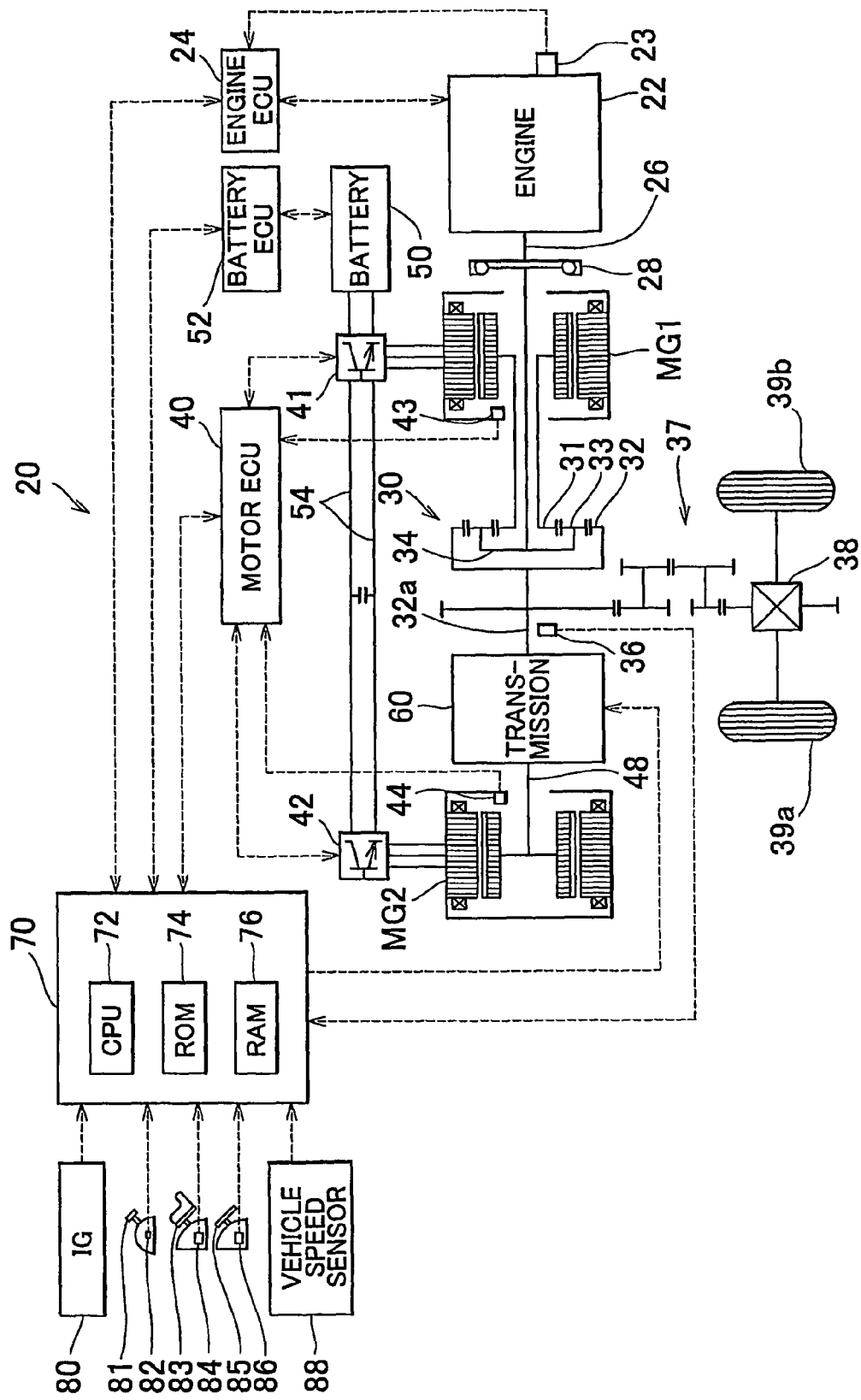
FIG. 1 is the view schematically showing the structure of a hybrid vehicle 20 including a power output apparatus according to an embodiment of the invention.

FIG. 1 is the view schematically showing the structure of a hybrid vehicle 20 that includes a power output apparatus according to an embodiment of the invention. As shown in FIG. 1, the hybrid vehicle 20 includes an engine 22; a three-axis power split/integration mechanism 30 that is connected via a damper 28 to a crankshaft 26 serving as the output shaft of the engine 22; a motor MG1 that is connected to the power split/integration mechanism 30 and that generates electric power; a motor MG2 that is connected to the power split/integration mechanism 30 via a transmission 60; and an electronic control unit for a hybrid vehicle (hereinafter, simply referred to as a "hybrid ECU) 70 that controls the entirety of the drive system of the hybrid vehicle 20.

The engine 22 is an internal combustion engine that outputs power using hydrocarbon fuel such as gasoline and diesel oil. An electronic control unit for an engine (hereinafter, referred to as an "engine ECU") 24 performs the operation controls on the engine 22, for example, the fuel injection control, the ignition control, and the intake air amount adjustment control. The engine ECU 24 receives signals from various sensors that detect the operating state of the engine 22. The engine ECU 24 receives signals from, for example, a crank position sensor 23 attached to the crankshaft 26. The engine ECU 24 communicates with the hybrid ECU 70. The engine ECU 24 controls the operation of the engine 22 based on the control signals from the hybrid ECU 70. The engine ECU 24 transmits the data concerning the operating state of the engine 22 to the hybrid ECU 70 when needed.

The power split/integration mechanism 30 is formed of a planetary gear set that includes a sun gear 31 formed of an external gear; a ring gear 32 formed of an internal gear and provided coaxially with the sun gear 31; multiple pinions 33 meshed with the sun gear 31 and the ring gear 32; and a carrier 34 that supports the multiple pinions 33 such that the pinions 33 can rotate on their axes and move around the sun gear 31. The planetary gear set changes the rotational speeds among the rotational elements (i.e., the sun gear 31, the ring gear 32, and the carrier 34).

In the power split/integration mechanism 30, the crankshaft 26 of the engine 22 is connected to the carrier 34, the motor MG1 is connected to the sun gear 31, and the motor MG2 is connected to the ring gear 32 via the transmission 60. When the motor MG1 serves as an electric power generator, the power split/integration mechanism 30 distributes the power, output from the engine 22 to the carrier 34, between the sun gear 31 and the ring gear 32 based on the gear ratio therebetween. When the motor MG1 serves as an electric motor, the power split/integration mechanism 30 integrates the power, output from the engine 22 to the carrier 34, and the power, output from the motor MG1 to the sun gear 31. Then, the power split/integration mechanism 30 outputs the integrated power to the ring gear 32. The ring gear 32 is mechanically connected to drive wheels 39a, 39b via a differential gear unit 38. Therefore, the power output to the ring gear 32 is output to the drive wheels 39a, 39b via a gear mechanism 37 and the differential gear unit 38.

Each of the motor MG1 and the motor MG2 is formed of a known synchronous generator-motor that can serve as an electric power generator as well as an electric motor. The motors MG1, MG2 exchange electric power with a battery 50 via inverters 41, 42, respectively. An electric power line 54 that connects the inverters 41, 42 to the battery 50 is formed of a positive bus-bar and a negative bus-bar that are shared by the inverters 41, 42. The electric power generated by one of the motors MG1, MG2 may be consumed by the other of the motors MG1, MG2. Accordingly, the motors MG1, MG2 may generate electric power to be supplied to the battery 50, or, alternatively, the battery may discharge the electric power to compensate for a shortfall in the electric power in the motors MG1, MG2.

If the electric power balance is maintained between the motor MG1 and the motor MG2, the battery 50 is neither supplied with electric power nor does the battery 50 discharge the electric power to the motors MG1, MG2. The motors MG1, MG2 are both controlled by an electronic control unit for a motor (hereinafter, referred to as a "motor ECU") 40. The motor ECU 40 receives the signals necessary to control the motors MG1, MG2, for example, the signals from rotational position sensors 43, 44 that detect the rotational positions of the rotors of the motors MG1, MG2, respectively, and the signals indicating the phase currents that are applied to the motors MG1, MG2, and that are detected by current sensors (not shown). The motor ECU 40 transmits the switching control signals to the inverters 41, 42.

The motor ECU 40 calculates the rotational speeds Nm1, Nm2 of the rotors of the motors MG1, MG2 based on the signals received from the rotational position sensors 43, 44, respectively, according to the rotational speed calculation routine (not shown). The motor ECU 40 communicates with the hybrid ECU 70. The motor ECU 40 controls the motors MG1, MG2 based on the control signals from the hybrid ECU 70, and transmits the data concerning the operating states of the motors MG1, MG2 to the hybrid ECU 70 when needed.

Figure 2:
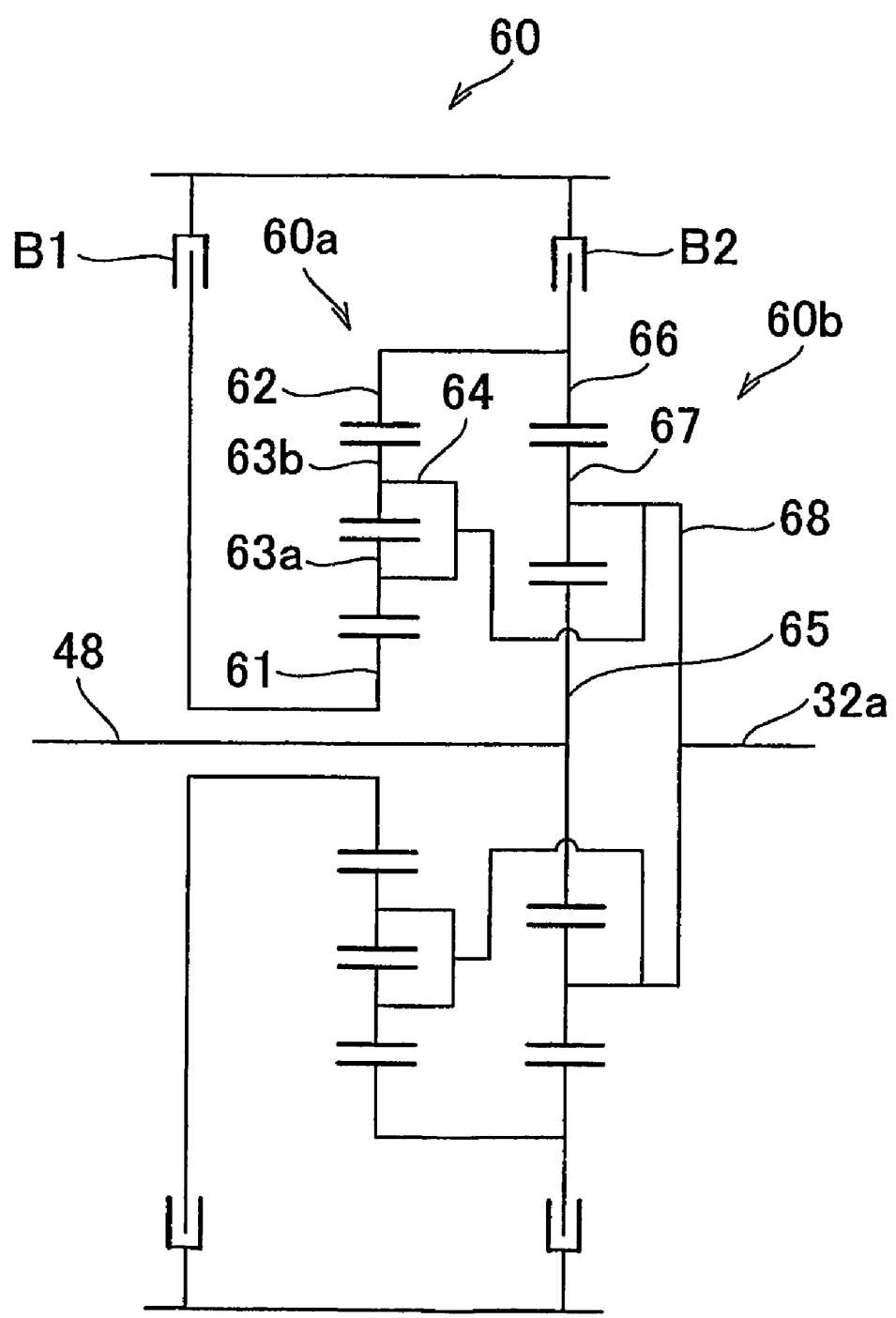
FIG. 2 is the view schematically showing the structure of a transmission 60.

The transmission 60 is arranged between a rotating shaft 48 of the motor MG2 and a ring gear shaft 32a and connects/disconnects the rotating shaft 48 and the ring gear shaft 32a to/from each other. When the rotating shaft 48 and the ring gear shaft 32 are connected to each other via the transmission 60, the transmission 60 can reduce the rotational speed of the rotating shaft 48 of the motor MG2 into one of two rotational speeds, and output the rotation having the reduced rotational speed to the ring gear shaft 32a. FIG. 2 shows an example of the structure of the transmission 60.

The transmission 60 shown in FIG. 2 includes a double-pinion planetary gear set 60a, a single pinion planetary gear set 60b, and two brakes B1, B2. The double pinion planetary gear set 60a includes a sun gear 61 that is formed of an external gear; a ring gear 62 that is formed of an internal gear provided coaxially with the sun gear 61; multiple first pinions 63a meshed with the sun gear 61; multiple second pinions 63b meshed with the first pinions 63a as well as the ring gear 62; and a carrier 64 that supports the first pinions 63a and the second pinions 63b such that the first pinions 63a mesh with the respective second pinions 63b and can rotate on their axes and move around the sun gear 61. Rotation of the sun gear 61 is permitted/stopped by releasing/applying the brake B1.

The single pinion planetary gear set 60b includes a sun gear 65 that is formed of an external gear; a ring gear 66 that is formed of an internal gear provided coaxially with the sun gear 65; multiple pinions 67 meshed with the sun gear 65 as well as the ring gear 66; and a carrier 68 that supports the pinions 67 such that the pinions 67 can rotate on their axes and move around the sun gear 65. The sun gear 65 is connected to the rotating shaft 48 of the motor MG2. The carrier 68 is connected to the ring gear shaft 32a. Rotation of the ring gear 66 is permitted/stopped by releasing/applying the brake B2.

The double pinion planetary gear set 60a and the single pinion planetary gear set 60b are connected to each other via the ring gear 62, the ring gear 66, the carrier 64, and the carrier 68. In the transmission 60, the rotating shaft 48 of the motor MG2 is disconnected from the ring gear shaft 32a by releasing both of the brakes B1, B2. When the brake B1 is released and the brake B2 is applied, the rotational speed of the rotating shaft 48 of the motor MG2 is reduced at a relatively large speed reduction ratio, and the rotation having the reduced rotational speed is output to the ring gear shaft 32a (hereinafter, referred to as "low gear"). When the brake B1 is applied and the brake B2 is released, the rotational speed of the rotating shaft 48 of the motor MG2 is reduced at a relatively small speed reduction ratio, and the rotation having the reduced rotational speed is output to the ring gear shaft 32a (hereinafter, referred to as "high gear").

When the brakes B1, B2 are both applied, rotations of the rotating shaft 48 and the ring gear shaft 32a are prohibited.

Figure 3:
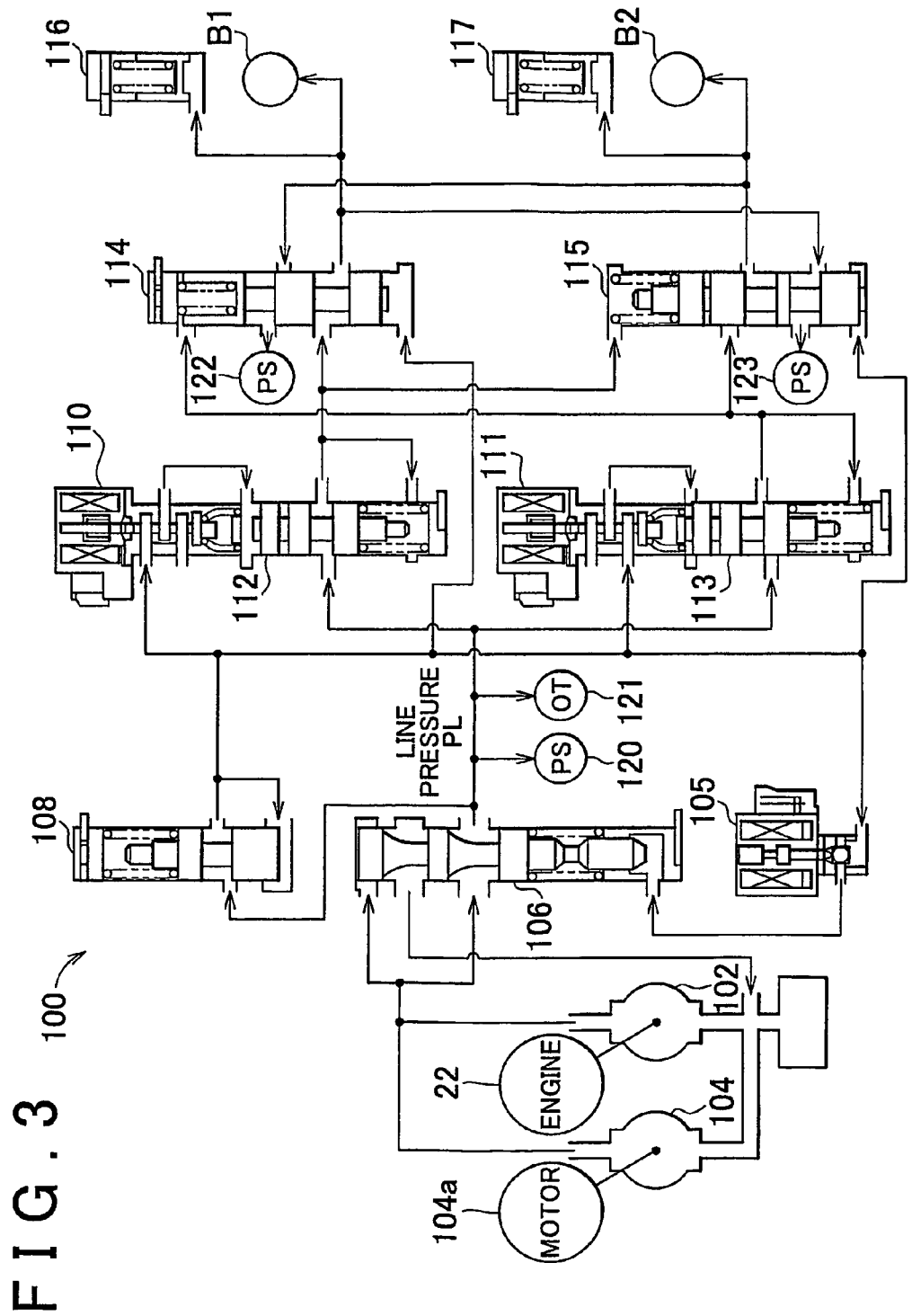
FIG. 3 is the view schematically showing the structure of a hydraulic circuit 100.

The brakes B1, B2 are applied/released by the hydraulic pressure from a hydraulic circuit 100 shown in FIG. 3. As shown in FIG. 3, the hydraulic circuit 100 includes a mechanical pump 102 that sends, under pressure, oil using the power from the engine 22; an electric pump 104 that sends, under pressure, oil using the power from a motor 104a embedded in the electric pump 104; a three-way solenoid 105 and a pressure control valve 106 that control the magnitudes of the line pressures of the oils (line pressures) sent, under pressure, from the mechanical pump 102 and the electric pump 104; linear solenoids 110, 111, and control valves 112, 113 that supply the line pressures to the brakes B1, B2, respectively while adjusting the line pressure; a modulator valve 108 that reduces the line pressure and supplies the reduced line pressure to the input ports of the three-way solenoid 105 and the linear solenoids 110, 111; fail-safe valves 114, 115 that are arranged between the control valves 112, 113 and the brakes B1, B2, respectively; and accumulators 116, 117 that are arranged between the fail-safe valves 114, 115 and the brakes B1, B2, respectively. When the hydraulic pressure is supplied from one of the control valves 112, 113, the fail-safe valves 114, 115 open the oil passage to the corresponding brake, and block the oil passage to the other brake. When a malfunction occurs such as when the hydraulic pressures are supplied from both of the control valves 112, 113, the fail-safe valves 114, 115 block both of the oil passages to the brakes B1, B2.

The battery 50 is controlled by an electronic control unit for a battery (hereinafter, referred to as a "battery ECU") 52. The battery ECU 52 receives the signals necessary to control the battery 50, for example, the signal indicating the voltage detected between the terminals of the battery 50, which is transmitted from a voltage sensor (not shown) provided between the terminals of the battery 50, the signals indicating the electric currents supplied to/discharged from the battery 50, which are transmitted from a current sensor (not shown) attached to the electric power line 54 connected to the output terminal of the battery 50, and the signal indicating the battery temperature, which is transmitted from a temperature sensor (not shown) attached to the battery 50. The battery ECU 52 transmits, when needed, the data concerning the condition of the battery 50 to the hybrid ECU 70. To control the battery 50, the battery ECU 52 calculates the state of charge (SOC) based on the value obtained by accumulating the amounts of electric currents supplied to/discharged from the battery 50, which are detected by the current sensor.

The hybrid ECU 70 is formed of a microprocessor mainly including a CPU 72. The hybrid ECU 70 includes ROM 74 that stores the processing programs, RAM 76 that temporarily stores the data, an input port (not shown), an output port (not shown), and a communication port (not shown), in addition to the CPU 72.

The hybrid ECU 70 receives, via the input port, the signal, transmitted from a rotational speed sensor 36, indicating the rotational speed Nr of the ring gear shaft 32a serving as the drive shaft the ignition signal from an ignition switch 80, the signal indicating the shift position SP from a shift position sensor 82 that detects the position of a shift lever 81, the signal indicating the accelerator pedal operation amount Acc detected by an accelerator pedal position sensor 84, corresponding to the amount by which an accelerator pedal 83 is depressed, the signal indicating the brake pedal position BP detected by a brake pedal position sensor 86, corresponding to the amount by which a brake pedal 85 is depressed, the signal indicating the vehicle speed V from a vehicle speed sensor 88, the signal indicating the line pressure PL from a hydraulic switch 120 that is actuated/de-actuated by the line pressure in the hydraulic circuit 100, the signal indicating the oil temperature Toil from an oil temperature sensor 121 that detects the temperature of the oil sent, under pressure, by the mechanical pump 102 and the electric pump 104, the signal indicating the brake pressure Pb1 from a hydraulic switch 122 that is actuated/de-actuated by the hydraulic pressure applied to the brake B1, the signal indicating the brake pressure Pb2 from a hydraulic switch 123 that is actuated/de-actuated by the hydraulic pressure applied to the brake B2, etc.

The hybrid ECU 70 transmits, for example, the drive signals to the three-way solenoid 105 and the linear solenoids 110, 111. As described above, the hybrid ECU 70 is connected to the engine ECU 24, the motor ECU 40, and the battery ECU 52 via the communication port. The hybrid ECU 70 exchanges various control signals and data with the engine ECU 24, the motor ECU 40, and the battery ECU 52.

In the hybrid vehicle 20 thus configured, the required torque that should be output to the ring gear shaft 32a is calculated based on the accelerator pedal operation amount Acc corresponding to the amount by which the accelerator pedal 83 is depressed by the driver and the vehicle speed V. Then, the engine 22, the motor MG1, and the motor MG2 are controlled so that the required power corresponding to the required torque is output to the ring gear shaft 32a.

The operation control of the engine 22, the motor MG1, and the motor MG2 includes the torque conversion operation mode, the electric power supply/discharge operation mode, and the motor operation mode. In the torque conversion operation mode, the engine 22 is controlled so that the power corresponding to the required power is output from the engine 22, and the motors MG1, MG2 are controlled so that the entire power output from the engine 22 undergoes torque conversion by the power split/integration mechanism 30, the motor MG1 and the motor MG2 and is then output to the ring gear shaft 32a. In the electric power supply/discharge operation mode, the engine 22 is controlled so that the power corresponding to the value, which is obtained by adding the electric power to be supplied to the battery 50 to the required power or which is obtained by subtracting the electric power to be discharged from the battery 50 from the required power, is output from the engine 22. Also, the motors MG1, MG2 are controlled so that the entire or part of power, which is output from the engine 22 based on the amount of electric power supplied to or discharged from the battery 50, undergoes torque conversion by the power split/integration mechanism 30, the motor MG1, and the motor MG2, and the required power is output to the ring gear shaft 32a. In the motor operation mode, the operation control is performed so that the engine 22 is stopped and the power corresponding to the required power from the motor MG2 is output to the ring gear shaft 32a.

Figure 4A:
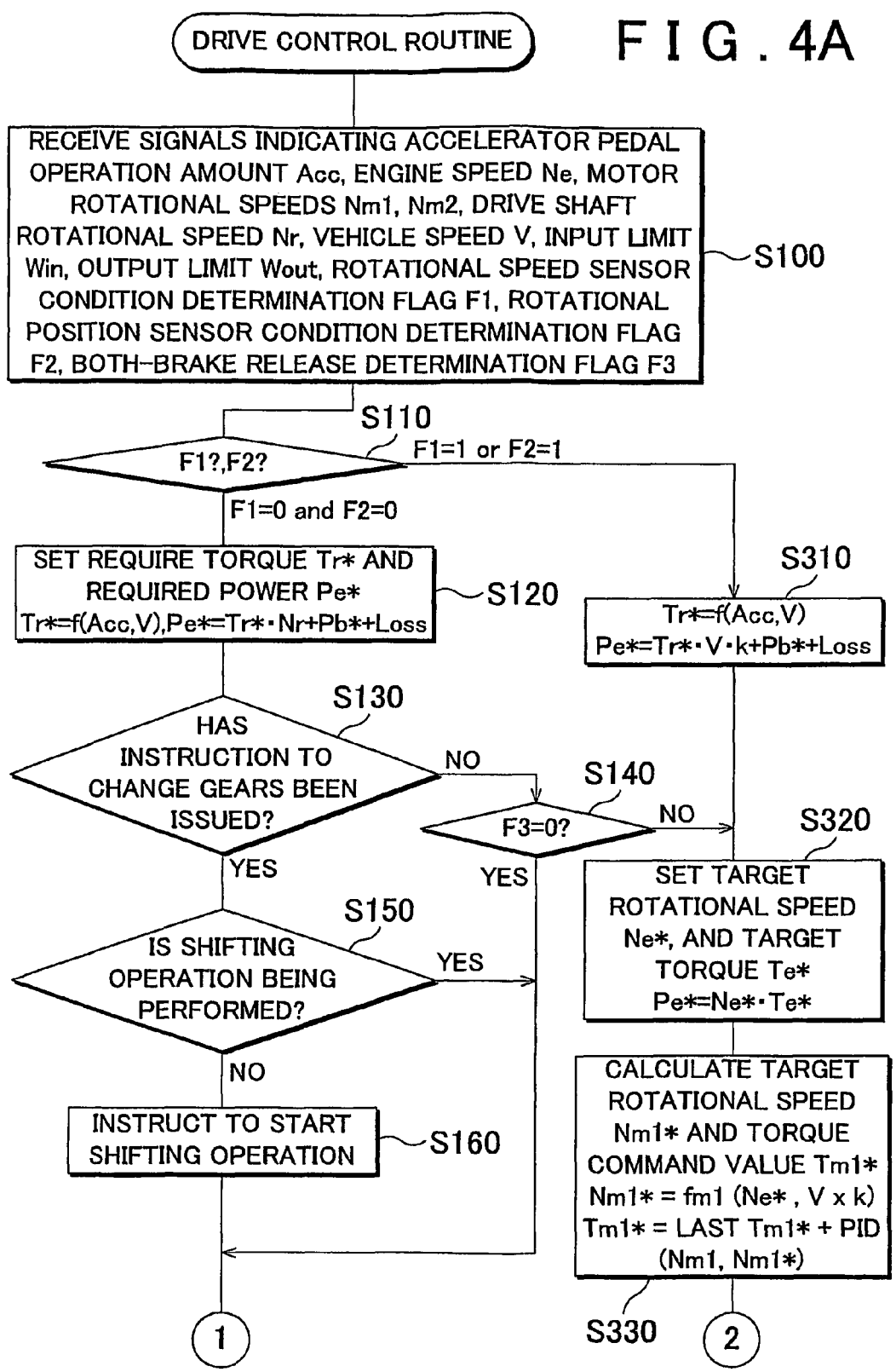

Next, the operation of the thus configured hybrid vehicle 20 will be described. FIG. 4 is the flowchart showing an example of the drive control routine performed by the hybrid ECU 70. The routine is performed at predetermined time intervals of, for example, several milliseconds.

In the drive control routine, first, the CPU 72 of the hybrid ECU 70 receives the data necessary to perform the drive control. Namely, the CPU 72 receives the signal indicating the accelerator pedal operation amount Acc from the accelerator pedal position sensor 84, the signal indicating the vehicle speed V from the vehicle speed sensor 88, the signal indicating the rotational speed Nr of the ring gear shaft 32a from the rotational speed sensor 36, the signal indicating the rotational speed Ne of the engine 22, the signals indicating the rotational speeds Nm1, Nm2 of the motors MG1, MG2, the signals indicating the input limit Win and the output limit Wout for the battery 50, the rotational speed sensor condition determination flag F1 that indicates whether the rotational speed sensor 36 is operating properly and is able to detect the rotational speed Nr of the ring gear shaft 32a, the rotational position sensor condition determination flag F2 that indicates whether the rotational position sensor 44 is operating properly and is able to detect the rotational position of the rotor of the motor MG2, the both-brake release determination flag F3 that indicates whether there is a possibility that the brakes B1, B2 of the transmission 60 are both released, etc (step S100). The rotational speed Ne of the engine 22 is calculated based on the signal from the crank position sensor 23 attached to the crankshaft 26, and the calculated rotational speed Ne is transmitted from the engine ECU 24 to the hybrid ECU 70.

The rotational speeds Nm1, Nm2 of the motors MG1, MG2 are calculated based on the rotational positions of the rotors of the motors MG1, MG2 detected by the rotational position sensors 43, 44, respectively, and the calculated rotational speeds Nm1, Nm2 are transmitted from the motor ECU 40 to the hybrid ECU 70. In addition, the input limit Win and the output limit Wout for the battery 50 are set based on the battery temperature Tb detected by the temperature sensor (not shown), and the state of charge (SOC) of the battery 50, and the input limit Win and output limit Wout are transmitted from the battery ECU 52 to the hybrid ECU 70.

The rotational speed sensor condition determination routine (not shown) is performed by the hybrid ECU 70 to determine, for example, whether transmission of the signal from the rotational speed sensor 36 to the hybrid ECU 70 has been stopped for a predetermined time period. If it is determined that the rotational speed sensor 36 is operating properly, the value of the rotational speed sensor condition determination flag F1 is set to "0". On the other hand, if it is determined that a malfunction occurs in the rotational speed sensor 36, the value of the rotational speed sensor condition determination flag F1 is set to "1". The CPU 72 of the hybrid ECU 70 obtains the rotational speed sensor condition determination flag F1 indicating "0" or "1" by reading it written in a predetermined address in the RAM 76.

Figure 5:
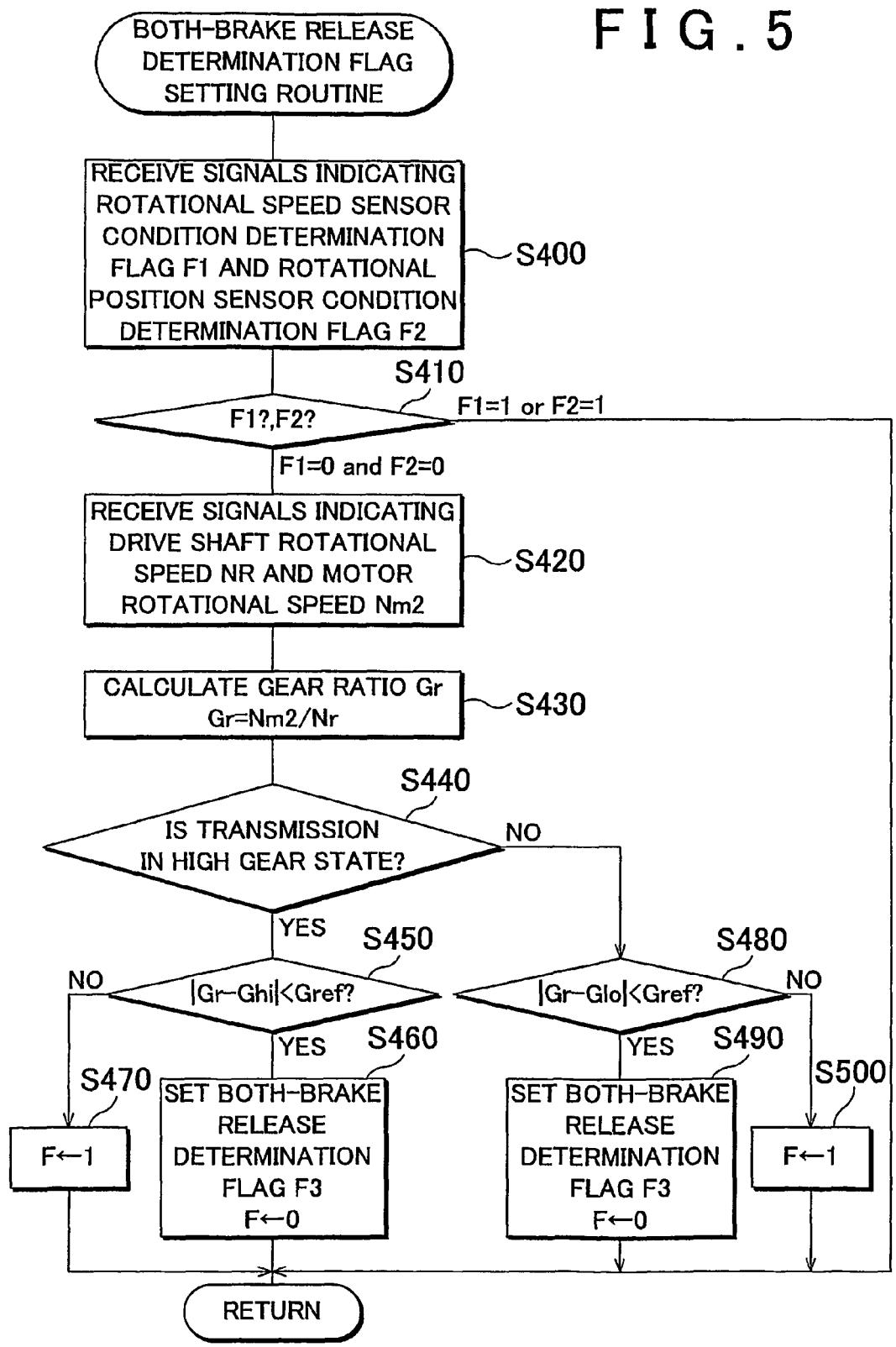
FIG. 5 is the flowchart showing an example of a both-brake release determination flag setting routine.

The rotational position sensor condition determination routine (not shown) is performed by the motor ECU 40 to determine, for example, whether transmission of the signal from the rotational position sensor 44 to the motor ECU 40 has been stopped for a predetermined time period. If it is determined that the rotational position sensor 44 is operating properly, the value of the rotational position sensor condition determination flag F2 is set to "0". On the other hand, if it is determined that a malfunction occurs in the rotational position sensor 44, the value of the rotational position sensor condition determination flag F2 is set to "1". The rotational position sensor condition determination flag F2 indicating "0" or "1" is transmitted from the motor ECU 40 to the hybrid ECU 70. The both-brake release determination flag setting routine in FIG. 5 is performed to determine whether there is a possibility that the brakes B1, B2 are both released. If it is determined that one of the brakes B1, B2 of the transmission 60 is applied, the value of the both-brake release determination flag F3 is set to "0". On the other hand, if it is determined that there is a possibility that the brakes B1, B2 are both released due, for example, to a malfunction in the hydraulic circuit 100, namely, there is a possibility that the rotating shaft 48 of the Motor MG2 is disconnected from the ring gear shaft 32a, the value of the both-brake release determination flag F3 is set to "1". The CPU 72 of the hybrid ECU 70 obtains the both-brake release determination flag F3 indicating "0" or "1" by reading it written in a predetermined address in the RAM 76.

The description of the drive control routine in FIG. 4 will be temporarily suspended, and the both-brake release determination flag setting routine in FIG. 5 will be described below. The routine is performed at predetermined time intervals, for example, of several milliseconds.

In the both-brake release determination flag setting routine, the CPU 72 of the hybrid ECU 70 receives the rotational speed sensor condition determination flag F1 and the rotational position sensor condition determination flag F2 (step S400), as in step S100 in the drive control routine in FIG. 4. Then, the CPU 72 of the hybrid ECU 70 checks the values of the rotational speed sensor condition determination flag F1 and the rotational position sensor condition determination flag F2 (step S410). If the rotational speed sensor condition determination flag F1 and the rotational position sensor condition determination flag F2 both indicate "0", the CPU 72 of the hybrid ECU 70 determines that the rotational speed sensor 36 and the rotational position sensor 44 are both operating properly, and receives the signals indicating the rotational speed Nm2 of the motor MG2 and the rotational speed Nr of the ring gear shaft 32a (step S420), as in step S100 in the drive control routine in FIG. 4. Then, the CPU 72 of the hybrid ECU 70 calculates the current gear ratio Gr in the transmission 60 by dividing the rotational speed Nm2 of the motor MG2 by the rotational speed Nr of the ring gear shaft 32a (step S430).

The CPU 72 of the hybrid ECU 70 determines the gear selected in the transmission 60 (step S440). If it is determined that the transmission 60 is in high gear, the CPU 72 of the hybrid ECU 70 compares the absolute value of the value obtained by subtracting the gear ratio Ghi in high gear from the current gear ratio Gr (=Nm2/Nr) with the threshold value Gref (step S450). When the absolute value of the value (Gr−Ghi) is less than the threshold value Gref, the value of the both-brake release determination flag F3 is set to "0" (step S460). On the other hand, when the absolute value of the value (Gr−Ghi) is equal to or exceeds the threshold value Gref, the value of the both-brake release determination flag F3 is set to "1" (step S470). Then, the both-brake release determination flag setting routine ends. On the other hand, if it is determined in step S440 that the transmission 60 is in low gear, the CPU 72 compares the absolute value of the value obtained by subtracting the gear ratio Glo in low gear from the current gear ratio Gr with the threshold value Gref (step S480). When the absolute value of the value (Gr−Glo) is less than the threshold value Gref, the value of the both-brake release determination flag F3 is set to "0" (step S490). On the other hand, when the absolute value of the value (Gr−Glo) is equal to or exceeds the threshold value Gref, the value of the both-brake release determination flag F3 is set to "1" (step S500). Then, the both-brake release determination flag setting routine ends.

The threshold value Gref is used to determine whether the calculated current gear ratio Gr can be regarded as equal to the gear ratio Ghi in high gear or the gear ratio Glo in low gear. The threshold value Gref is set based, for example, on the accuracy of the rotational position sensor 44 and the accuracy of the rotational speed sensor 36. In the both-brake release determination flag setting routine, it is determined whether there is a possibility that the brakes B1, B2 of the transmission 60 are both released based on the rotational speed Nm2 of the motor MG2 and the rotational speed Nr of the ring gear shaft 32a.

If the gear ratio Gr deviates from the gear ratio Ghi in high gear when the transmission 60 should be in high gear or if the gear ratio Gr deviates from the gear ratio Glo in low gear when the transmission 60 should be in low gear, it is determined that there is a possibility that the brakes B1, B2 are both released due, for example, to a malfunction in the hydraulic circuit 100. Then, the CPU 72 sets the value of the both-brake release determination flag F3 to "1".

If it is determined in step S410 that at least one of the rotational speed sensor condition determination flag F1 and the rotational position sensor condition determination flag F2 indicates "1", it is determined that a malfunction occurs in at least one of the rotational speed sensor 36 and the rotational position sensor 44. In this case, because it is not possible to determine whether there is a possibility that the brakes B1, B2 of the transmission 60 are both released based on the rotational speed Nm2 of the motor MG2 and the rotational speed Nr of the ring gear shaft 32a, the both-brake release determination flag setting routine ends without setting the value of the both-brake release determination flag F3.

The drive control routine in FIG. 4 will be described again. After receiving the data in step S100, the hybrid ECU 70 checks the value of the rotational speed sensor condition determination flag F1 and the rotational position sensor condition determination flag F2 (step S110). When the rotational speed sensor condition determination flag F1 and the rotational position sensor condition determination flag F2 both indicate "0", the hybrid ECU 70 determines that the rotational speed sensor 36 and the rotational position sensor 44 both operate properly, and sets the required torque Tr* to be output to the ring gear shaft 32a connected to the drive wheels 39a, 39b, as the torque required for the vehicle, and the required power Pe* required for the vehicle, based on the received accelerator pedal operation amount Acc and vehicle speed V (step S120). The relationship among the accelerator pedal operation amount Acc, the vehicle speed V and the required torque Tr* is set in advance and stored in the ROM 74 as the required torque-setting map. The required torque Tr* is derived from the map based on the accelerator pedal operation amount Acc and the vehicle speed V.

Figure 6:
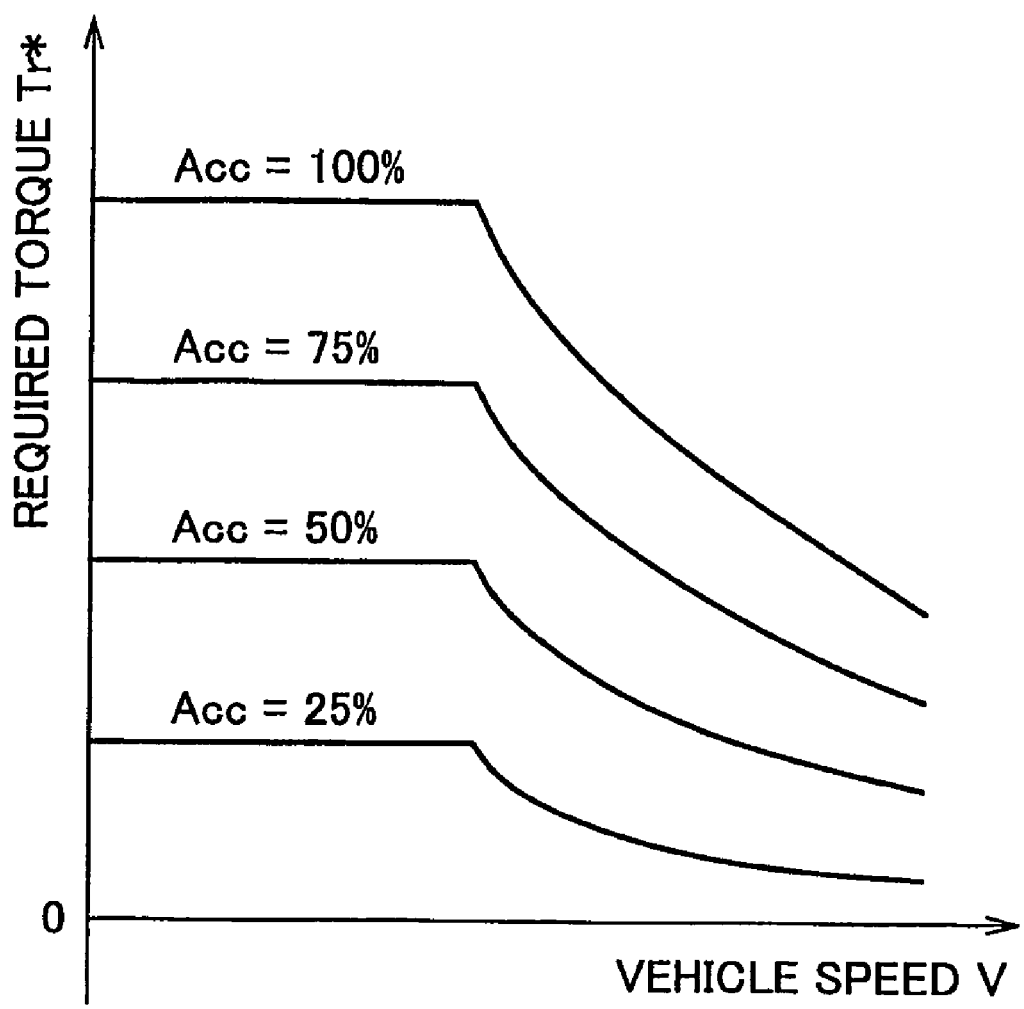
FIG. 6 is the graph showing an example of the map used to set the required torque.

FIG. 6 shows an example of the required torque-setting map. The required power Pe* is obtained by adding the value, obtained by multiplying the required torque Tr* by the rotational speed Nr of the ring gear shaft 32a, the required supply/discharge power Pb* required for the battery 50, and the loss Loss. The rotational speed Nr of the ring gear shaft 32a may be obtained by multiplying the vehicle speed V by the conversion coefficient "k" instead of obtaining the value detected by the rotational speed sensor 36.

Next, the hybrid ECU 70 determines whether an instruction to change the gears of the transmission 60 is issued (step S130). An instruction to change the gears of the transmission 60 is issued at a time set in advance based on the required torque Tr* and the vehicle speed V. If it is determined that an instruction to change the gears of the transmission 60 is not issued, the hybrid ECU 70 checks the value of the both-brake release determination flag F3 (step S140). If the both-brake release determination flag F3 indicates "0", the hybrid ECU 70 determines that one of the brakes B1, B2 of the transmission 60 is applied, and compares the required power Pe* with the threshold value Pref (step S170). The threshold value Pref is set based, for example, on the properties of the engine 22. The threshold value Pref is set, for example, to the lower limit of the power at which the engine 22 is efficiently operated.

When the required power Pe* is equal to or exceeds the threshold value Pref, the hybrid ECU 70 determines whether the engine 22 is operating (step S180). If it is determined that the engine 22 is operating, the hybrid ECU 70 sets the target rotational speed Ne* and the target torque Te* for the engine 22 based on the required power Pe* (step S190). The target rotational speed Ne* and the target torque Te* are set based on the operation line, on which the engine 22 is efficiently operated, and the required power Pe*.

Figure 7:
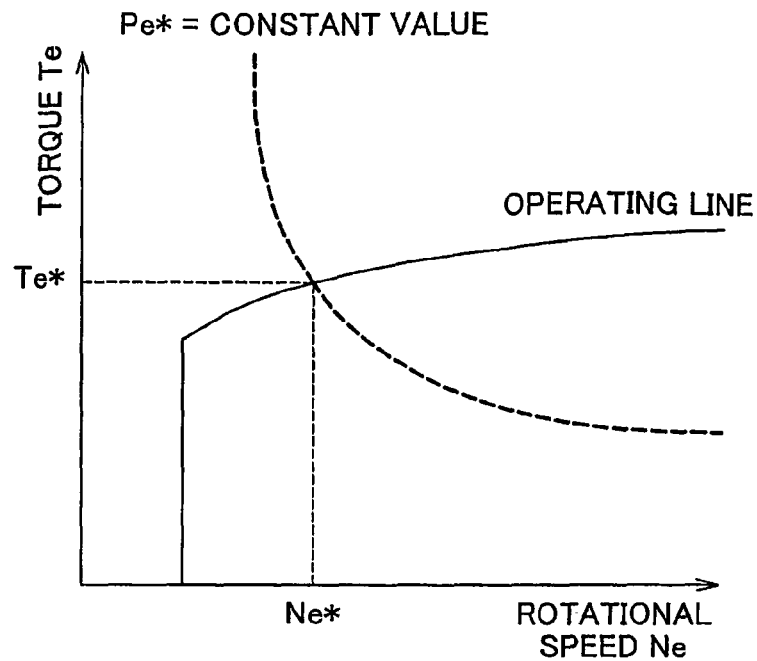
FIG. 7 is the graph showing an example of the operation line of an engine 22, and the manner in which the target rotational speed Ne* and the target torque Te* are set.

FIG. 7 shows an example of the operation line for the engine 22, and the manner in which the target rotational speed Ne* and the target torque Te* are set. As shown in FIG. 7, the target rotational speed Ne* and the target torque Te* are obtained using the point of intersection of the operation line and the curve on which the required power Pe* (Ne*×Te*) is maintained constant.

After the target rotational speed Ne* and the target torque Te* for the engine 22 are set, the target rotational speed Nm1* for the motor MG1 is calculated according to the following equation (1) based on the target rotational speed Ne* for the engine 22, the rotational speed Nr of the ring gear shaft 32a, and the gear ratio ρ of the power split/integration mechanism 30. Also, the torque command value Tm1* for the motor MG1 is calculated according to equation (2) based on the target rotational speed Nm1* and the current rotational speed Nm1 (step S200). Equation (1) is the dynamic equation concerning the rotational elements of the power split/integration mechanism 30.

Figure 8:
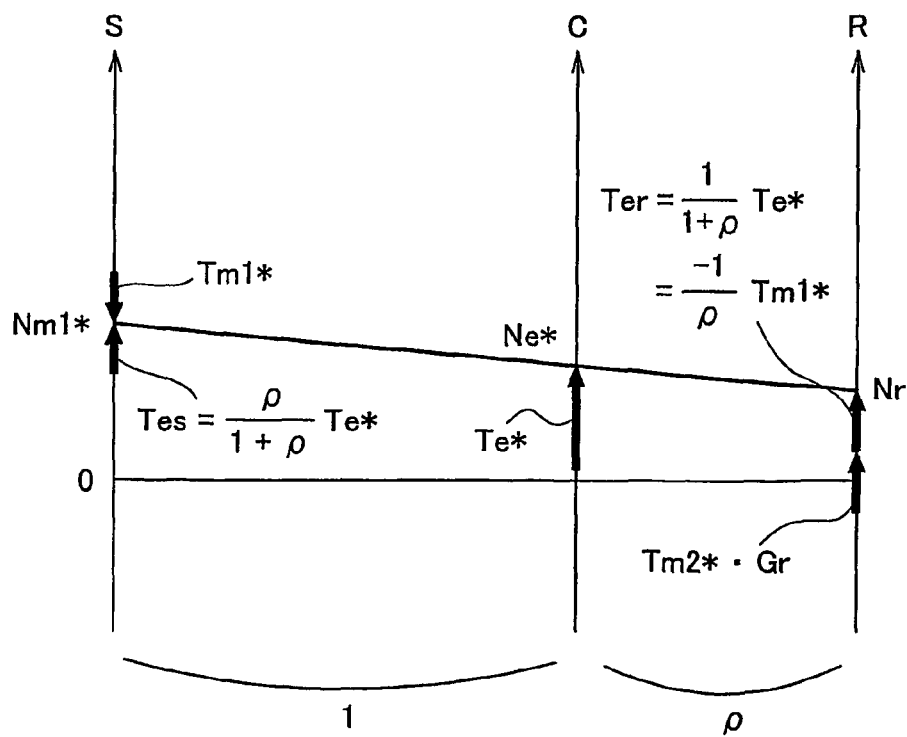
FIG. 8 is the view showing an example of a collinear view used to describe the rotational elements of a power split/integration mechanism 30 from the dynamic viewpoint.

FIG. 8 shows the collinear view indicating the dynamic relationship between the rotational speed and the torque in the rotational elements of the power split/integration mechanism 30. In FIG. 8, the S axis indicates the rotational speed of the sun gear 31 that is the rotational speed Nm1 of the motor MG1, the C axis indicates the rotational speed of the carrier 34 that is the rotational speed Ne of the engine 22, and the R axis indicates the rotational speed Nr of the ring gear 32 (the ring gear shaft 32a). Equation (1) can be easily derived from the collinear view.

One of the two heavy arrows on the R axis indicates the torque, which is output to the ring gear shaft 32a, in the torque Te*, which is output from the engine 22 when the engine 22 is normally operated at the operation point at which the target rotational speed Ne* and the target torque Te* for the engine 22 are achieved. The other heavy arrow on the R axis indicates the torque, which is applied to the ring gear shaft 32a via the transmission 60, in the torque Tm2* output from the motor MG2. Equation (2) is used in the feedback control for rotating the motor MG1 at the target rotational speed Nm1*. In equation (2), "k1" in the second term on the right side is the gain in the proportional term, and "k2" in the third term on the right side is the gain in the integral term.

$$Nm1^* = Ne^* \times (1+\rho)/\rho - Nr/\rho \quad (1)$$

$$Tm1^* = \text{last } Tm1^* + k1(Nm1^* - Nm1) + k2\int(Nm1^* - Nm1)dt \quad (2)$$

After the target rotational speed Nm1* and the torque command value Tm1* for the motor MG1 are calculated, the torque limits Tmin, Tmax, which are the lower and upper limits of the torque that can be output from the motor MG2, are calculated according to equations (3) and (4) shown below, respectively. In equations (3) and (4), the torque limits Tmin, Tmax are calculated by dividing the deviations of the input limit Win and the output limit Wout for the battery 50 from the electric power consumed (generated) by the motor MG1, which is calculated by multiplying the torque command value Tm1* for the motor MG1 by the current rotational speed Nm1 of the motor MG1, respectively, by the rotational speed Nm2 of the motor MG2 (step S210). Then, the gear ratio Gr currently used in the transmission 60 is calculated by dividing the rotational speed Nm2 of the motor MG2 by the rotational speed Nr of the ring gear shaft 32a (step S220). The temporary motor torque Tm2tmp, which is the torque to be output from the motor MG2, is calculated according to equation (5) based on the current gear ratio Gr, the required torque Tr*, the torque command value Tm1*, and the gear ratio ρ of the power split/integration mechanism 30 (step S230). The torque command value Tm2* for the motor MG2 is set to the value obtained by limiting the temporary motor torque Tm2tmp using the torque limits Tmin, Tmax (step S240). Setting the torque command value Tm2* for the motor MG2 makes it possible to set the required toque Te* to be output to the ring gear shaft 32a to the torque limited within the range between the input limit Win and the output limit Wout for the battery 50. Equation (5) can be easily derived from the collinear view in FIG. 8.

$$Tmin = (Win - Tm1^* \times Nm1)/Nm2 \quad (3)$$

$$Tmax = (Wout - Tm1^* \times Nm1)/Nm2 \quad (4)$$

$$Tm2tmp = (Tr^* + Tm1^*/\rho)/Gr \quad (5)$$

After the target rotational speed Ne* and the target torque Te* for the engine 22, and the torque command values Tm1*, Tm2* for the motors MG1, MG2 are set, the signals indicating the target rotational speed Ne* and the target torque Te* for the engine 22 are transmitted to the engine ECU 24, and the signals indicating the torque command values Tm1*, Tm2* for the motors MG1, MG2 are transmitted to the motor ECU 40 (step S250), after which the drive control routine ends.

After receiving the signals indicating the target rotational speed Ne* and the target torque Te*, the engine ECU 24 performs the controls of the engine 22, for example, the fuel injection control and the ignition control so that the engine 22 is operated at the operation point at which the target rotational speed Ne* and the target torque Te* are achieved. After receiving the signals indicating the torque command values Tm1*, Tm2*, the motor ECU 40 performs the switching control on the switching elements of the inverters 41, 42 so that the motor MG1 is driven based on the torque command value Tm1* and the motor MG2 is driven based on the torque command value Tm2*.

If it is determined in step S180 that the engine 22 is not operating, the hybrid ECU 70 sets the motoring torque Tcr for driving the engine 22 using the motor MG1 to the torque command value Tm1* for the motor MG1 (step S260). Then, the hybrid ECU 70 compares the rotational speed Ne of the engine 22 with the threshold value Nref (step S270). If the rotational speed Ne of the engine 22 is equal to or below the threshold value Nref, the hybrid ECU 70 performs steps S210 to S250, after which the drive control routine ends. On the other hand, if the rotational speed Ne of the engine 22 exceeds the threshold value Nref, the hybrid ECU 70 instructs the engine ECU 24 to perform the fuel injection control and the ignition control (step S280), and performs steps S210 to 5250, after which the drive control routine ends.

Namely, if the engine 22 is not operating when the required power Pe* is equal to or exceeds the threshold value Pref, the engine 22 is driven by the motor MG1 while the reaction force on the ring gear shaft 32a side is generated by the motor MG2. The motoring torque Tcr may be a predetermined value, or may be set based on the rotational speed Ne of the engine 22 and the time that has elapsed since driving of the engine 22 is driven the motor MG1. The threshold value Nref is the rotational speed of the engine 22, at which the fuel injection control and the ignition control are started. The threshold value Nref may be set, for example, to 1000 rpm or 1200 rpm.

If it is determined in step S170 that the required power Pe* is less than the threshold value Pref, the hybrid ECU 70 sets the target rotational speed Ne* and the target torque Te* for the engine 22 to "0" so that the engine 22 stops (step S290). Then, the hybrid ECU 70 sets the torque command value Tm1* for the motor MG1 to "0" (step S300), and performs steps S210 to S250, after which the drive control routine ends. The engine ECU 24 receives the signals indicating that the target rotational speed Ne* and the target torque Te* are "0". When the engine 22 is not operating, the engine ECU 24 maintains the state where the engine 22 is not operating. On the other hand, when the engine 22 is operating, the engine ECU 24 stops the engine 22.

If it is determined in step S130 that an instruction to change the gears of the transmission 60 is issued, the hybrid ECU 70 determines whether the shifting operation is being performed (step S150). If it is determined that the shifting operation is not being performed, the hybrid ECU 70 issues an instruction to start the shifting operation for changing the gears of the transmission 60 (step S160). When an instruction to start the shifting operation is issued, the hybrid ECU 70 starts the shifting operation routine shown in FIG. 9 while performing the drive control routine shown in FIG. 4. The description of the drive control routine in FIG. 4 will be temporarily suspended, and the shifting operation routine shown in FIG. 9 will be described below.

In the shifting operation routine, the CPU 72 of the hybrid ECU 70 determines whether the transmission is upshifting or downshifting (step S600). If it is determined that the transmission is upshifting, the brake B2 is released (step S610), and the brake B1 is applied (step S620). Then, the hybrid ECU 70 receives the signal indicating the rotational speed Nm2 of the motor MG2 and the signal indicating the rotational speed Nr of the ring gear shaft 32a, as in step S100 of the drive control routine in FIG. 4 (step S630). The hybrid ECU 70 then determines whether the rotational speed Nm2 of the motor MG2 is near the rotational speed Nm2* of the motor MG2 after the shifting operation (=Nr×Ghi), which is calculated by multiplying the rotational speed Nr of the ring gear shaft 32a by the gear ratio Ghi in the transmission 60 in high gear (steps S640, 650). If it is determined that the rotational speed Nm2 of the motor MG2 is not near the rotational speed Nm2* of the motor MG2 after the shifting operation, the hybrid ECU 70 performs steps S630 to S650 until the rotational speed Nm2 of the motor MG2 comes close to the rotational speed Nm2* of the motor MG2 after the shifting operation. When the rotational speed Nm2 of the motor MG2 is near the rotational speed Nm2* of the motor MG2 after the shifting operation, the brake B1 is fully applied (step S660), after which the shifting operation routine ends.

On the other hand, if it is determined that the transmission is downshifting, the brake B1 is released (step S670). The hybrid ECU 70 receives the signal indicating the rotational speed Nm2 of the motor MG2 and the signal indicating the rotational speed Nr of the ring gear shaft 23a (step S680), and determines whether the rotational speed Nm2 of the motor MG2 is near the rotational speed Nm2* of the motor MG2 after the shifting operation, which is calculated by multiplying the rotational speed Nr of the ring gear shaft 32a by the gear ratio Glo in the transmission 60 in low gear (=Nr×Glo) due to the positive torque output from the motor MG2 (steps S690, S700). If it is determined that the rotational speed Nm2 of the motor MG2 is not near the rotational speed Nm2* of the motor MG2 after the shifting operation, the hybrid ECU 70 performs steps S680 to S700 until the rotational speed Nm2 of the motor MG2 comes close to the rotational speed Nm2* of the motor MG2 after the shifting operation. When the rotational speed Nm2 of the motor MG2 is near the rotational speed Nm2* of the motor MG2, the brake B2 is fully applied (step S710), after which the shifting operation routine ends.

As described so far, the synchronous determination is made based on the rotational speed Nm2 of the motor MG2 and the rotational speed Nr of the ring gear shaft 32a in order to smoothly change the gears of the transmission 60. When the transmission is upshifting, the brake B1 is applied and the brake B2 is released. When the transmission is downshifting, the brake B1 is released, and the brake B2 is applied.

After the shifting operation is thus completed, it is determined, in step S130 in the subsequent drive control routine in FIG. 4, that an instruction to change the gears of the transmission 60 is not issued.

The drive control routine in FIG. 4 will be described again. If it is determined in step S140 that the both-brake release determination flag F3 indicates "1", the hybrid ECU 70 determines that there is a possibility that the brakes B1, B2 of the transmission 60 are both released due, for example, to a malfunction in the hydraulic circuit 100. The hybrid ECU 70 then sets the target rotational speed Ne* and the target torque Te* for the engine 22 and the torque command value Tm1* for the motor MG1, as in step S190, S200 described above, regardless of the required power Pe* (steps S320, S330), sets the torque command value Tm2* for the motor MG2 to "0" (step S340), and transmits the signals indicating the target rotational speed Ne* and the target torque Te* for the engine 22 to the engine ECU 24, and the signals indicating the torque command values Tm1*, Tm2* for the motors MG1, MG2 to the motor ECU 40 (step S250), after which the drive control routine ends.

Namely, when there is a possibility that the brakes B1, B2 of the transmission 60 are both released, the operation of the engine 22 continues, and the torque command value Tm2* for the motor MG2 is set to "0".

The following description will be provided on the assumption that the brakes B1, B2 are both released due to a malfunction in the transmission 60, namely, the rotating shaft 48 of the motor MG2 is disconnected from the ring gear shaft 32a. When the engine 22 is started, usually, the engine 22 is driven by the motor MG1 while the reaction force on the ring gear shaft 32a side is generated by the motor MG2, as described above. However, when the rotating shaft 48 of the motor MG2 is disconnected from the ring gear shaft 32a, the reaction force on the ring gear shaft 32a side cannot be generated by the motor MG2. Accordingly, if the engine 22 is driven by the motor MG1, unexpected changes may occur in the rotational speed Nr of the ring gear shaft 23a, which imparts a shock to the vehicle. In addition, when the rotating shaft 48 of the motor MG2 is disconnected from the ring gear shaft 32a, if the torque command value Tm2 for the motor MG2 is set in the same manner as that when one of the brakes B1, B2 is applied, the rotational speed Nm2 of the motor MG2 may abruptly increase.

To minimize such inconvenience, according to the embodiment, when there is a possibility that the brakes B1, B2 of the transmission 60 are both released, the operation of the engine 22 continues, and the torque command value Tm2* for the motor MG2 is set to "0". Thus, the vehicle can run using the torque output from the engine 22 via the power split/integration mechanism 30 to the ring gear shaft 32a. Namely, the vehicle runs using the torque, obtained by limiting the required torque Tr*, which is output to the ring gear shaft 32a.

Figure 9:
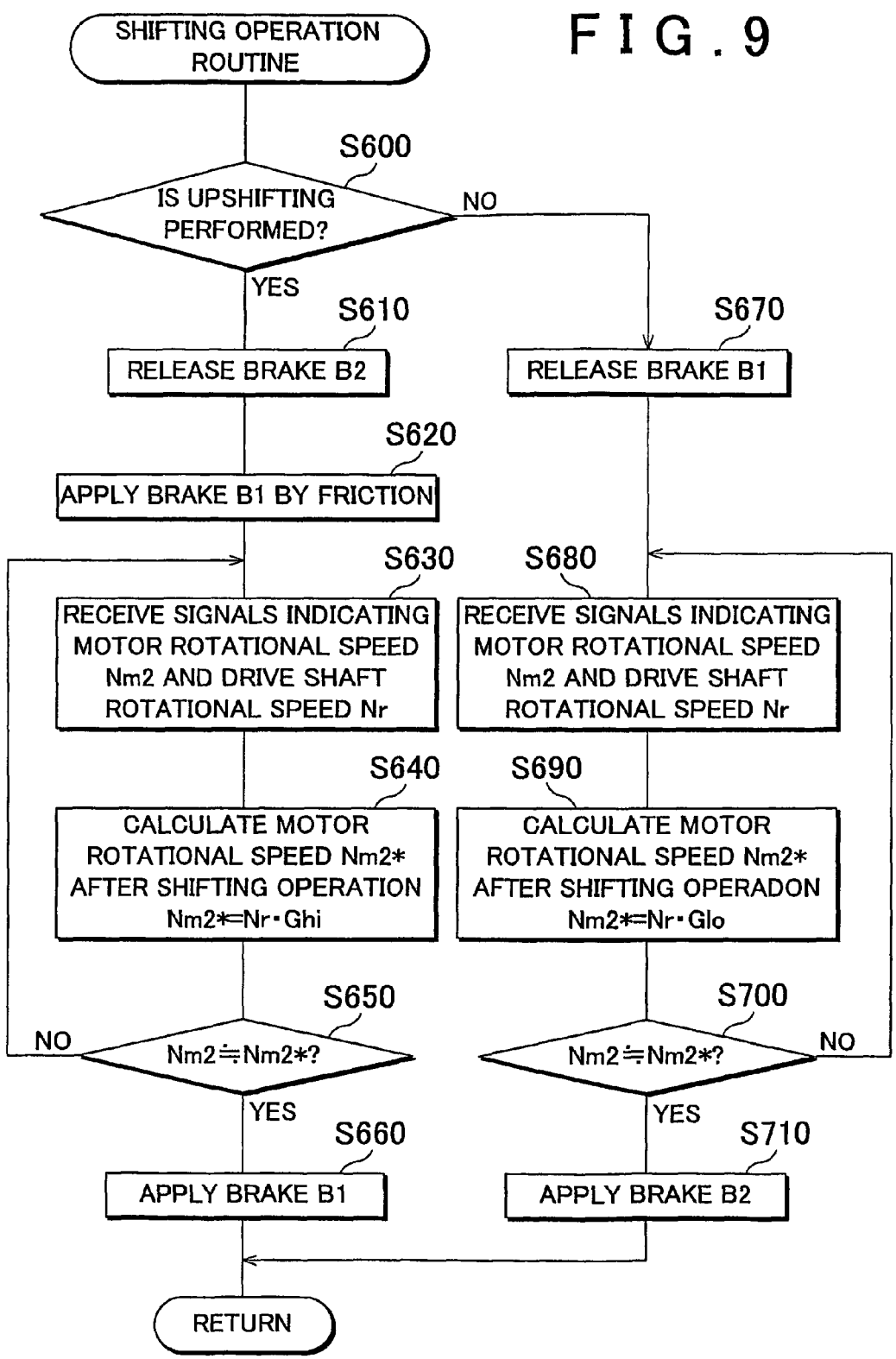
FIG. 9 is the flowchart showing an example of the shifting operation routine.

If it is determined in step S130 that a request to change the gears of the transmission 60 is issued, the rotational speed Nm2 of the motor MG2 is changed according to the shifting operation routine in FIG. 9 so that the rotational speed Nm2 of the motor MG2 comes close to the rotational speed Nm2* after the shifting operation. Thus, in the both-brake release determination flag setting routine in FIG. 5, the value of both-brake release determination flag F3 is set to "1". However, the shifting operation is performed for, for example, 200 to 400 milliseconds. Accordingly, in the embodiment, when a request to change the gears of the transmission 60 is issued, step S150 and the following steps are performed without checking the value of the both-brake release determination flag F3.

If it is determined in step S130 that a request to change the gears of the transmission 60 is issued, the value of the both-brake release determination flag F3 need not be set in the both-brake release determination flag setting routine in FIG. 5.

If it is determined in step S110 that at least one of the rotational speed sensor condition determination flag F1 and the rotational position sensor condition determination flag F2 indicates "1", it is determined that a malfunction occurs in at least one of the rotational speed sensor 36 and the rotational position sensor 44, namely, at least one of the rotational speed Nr of the ring gear shaft 32a and the rotational position of the rotor of the motor MG2 cannot be detected. Then, as in step S120 described above, the required torque Tr* is set based on the accelerator pedal operation amount Acc and the vehicle speed V, and the required power Pe* is calculated by adding the value, obtained by multiplying the rotational speed Nr of the ring gear shaft 32a, calculated by multiplying the vehicle speed V by the conversion coefficient k, by the required torque Tr*, the required supply/discharge power Pb* required for the battery 50, and the loss Loss (step S310). Then, steps S320 to S340, and step S250 are performed, after which the drive control routine ends.

Namely, when a malfunction occurs in at least one of the rotational speed sensor 36 and the rotational position sensor 44, the operation of the engine 22 continues, the torque output from the motor MG2 is limited, and the gears of the transmission 60 are not changed.

The reasons will be described below. First, the reason why the operation of the engine 22 continues and the reason why the torque output from the motor MG2 is limited will be described. When a malfunction occurs in at least one of the rotational speed sensor 36 and the rotational position sensor 44, it is not possible to determine, in the both-brake release determination flag setting routine in FIG. 5, whether the brakes B1, B2 of the transmission 60 are both released based on the rotational speed Nm2 of the motor MG2 and the rotational speed Nr of the ring gear shaft 32a.

If the engine 22 is intermittently operated at this time, when the engine 22 is driven by the motor MG1 with the both brakes B1, B2 released, unexpected changes may occur in the rotational speed Nr of the ring gear shaft 32a, and a shock may be imparted to the vehicle due to such unexpected changes, as described above. If a large torque is output from the motor MG2 at this time, when the brakes B1, B2 are both released, the rotational speed Nm2 of the motor MG2 may abruptly increase, as described above. In order to minimize such inconvenience, according to the embodiment, when a malfunction occurs in at least one of the rotational speed sensor 36 and the rotational position sensor 44, the operation of the engine 22 continues, and the torque output from the motor MG2 is limited.

Next, the reason why the gears of the transmission 60 are not changed will be described. When a malfunction occurs in at least one of the rotational speed sensor 36 and the rotational position sensor 44, it is not possible to make a synchronous determination, in the shifting operation routine in FIG. 9, as to whether the rotational speed Nm2 of the motor MG2 is near the rotational speed Nm2* of the motor MG2 after the shifting operation based on the rotational speed Nm2 of the motor MG2 and the rotational speed Nr of the ring gear shaft 32a.

Accordingly, if the gears of the transmission 60 are changed in this state, the gears of the transmission 60 cannot be changed smoothly, and the components of the transmission 60 such as the brakes B1, B2 may wear out due to a sudden application of one of the brakes B1, B2. Also, such sudden application of one of the brakes B1, B2 may impart a shock to the vehicle. In order to minimize such inconvenience, according to the embodiment, when a malfunction occurs in at least one of the rotational speed sensor 36 and the rotational position sensor 44, the gears of the transmission 60 are not changed.

When the rotational speed sensor condition determination flag F1 indicates "0", the value detected by the rotational speed sensor 36 may be used as the rotational speed Nr of the ring gear shaft 32a in step S310.

In the hybrid vehicle 20 according to the embodiment described above, when a malfunction occurs in at least one of the rotational speed sensor 36 and the rotational position sensor 44, the gears of the transmission 60 are not changed. Accordingly, it is possible to suppress wearing-out of the components of the transmission 60 such as the brakes B1, B2, which is caused by changing the gears when the synchronous determination for smoothly change the gears of the transmission 60 cannot be made.

In the hybrid vehicle 20 according to the embodiment described above, when a malfunction occurs in at least one of the rotational speed sensor 36 and the rotational position sensor 44, the operation of the engine 22 continues. Accordingly, it is possible to suppress unexpected changes in the rotational speed Nr of the ring gear shaft 32a, which are caused by driving the engine 22 using the motor MG1 when the rotating shaft 48 of the motor MG2 is disconnected from the ring gear shaft 32a because it cannot be determined whether the rotating shaft 48 of the motor MG2 is disconnected from the ring gear shaft 32a. In addition, it is possible to suppress a shock imparted to the vehicle due to such unexpected changes in the rotational speed Nr of the ring gear shaft 32a.

In the hybrid vehicle 20 according to the embodiment described above, when a malfunction occurs in at least one of the rotational speed sensor 36 and the rotational position sensor 44, the torque output from the motor MG2 is limited. Accordingly, it is possible to suppress output of a large torque from the motor MG2, which occurs when the rotating shaft 48 of the motor MG2 is disconnected from the ring gear shaft 32a because it cannot be determined whether the rotating shaft 48 of the motor MG2 is disconnected from the ring gear shaft 32a. In addition, abrupt increases in the rotational speed Nm2 of the motor MG2 can be suppressed.

In the hybrid vehicle 20 according to the embodiment described above, when a malfunction occurs in at least one of the rotational speed sensor 36 and the rotational position sensor 44, continuation of the operation of the engine 22, limitation of the torque output from the motor MG2, and maintenance of the gear of the transmission 60 are all performed. Alternatively, one or two of these controls may be performed.

In the hybrid vehicle 20 according to the embodiment described above, when a malfunction occurs in at least one of the rotational speed sensor 36 and the rotational position sensor 44, the operation of the engine 22 continues. Alternatively, the state where the engine 22 is not operated may continue. In this case as well, it is possible to suppress a shock imparted to the vehicle due to unexpected changes in the rotational speed Nr of the ring gear shaft 32a, which may be caused by driving the engine 22 using the motor MG1 when the rotating shaft 48 of the motor MG2 is disconnected from the ring gear shaft 32a.

In the hybrid vehicle according to the embodiment described above, it is determined whether the operation of the engine 22 should continue, the torque output from the motor MG2 should be limited, and the gears of the transmission 60 should be maintained based on the conditions of the rotational speed sensor 36 and the rotational position sensor 44. Alternatively, such a determination may be made based only on the condition of one of the rotational speed sensor 36 and the rotational position sensor 44.

Figure 10:
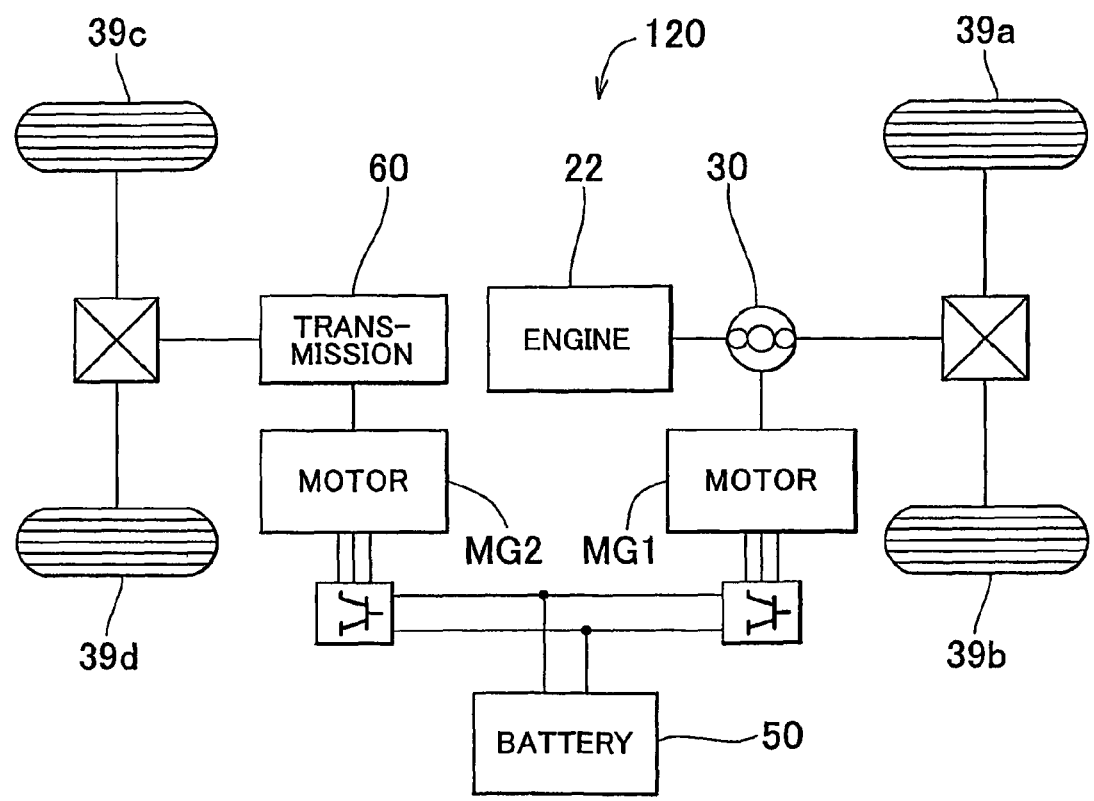
FIG. 10 is the view schematically showing the structure of a hybrid vehicle 120 according to a modified example of the embodiment of the invention.

In the hybrid vehicle 20 according to the embodiment described above, the power from the motor MG2 is output to the ring gear shaft 32a while the rotational speed of the motor MG2 is reduced by a reduction gear 35. Alternatively, as shown in the hybrid vehicle 320 according to a modified example of the embodiment shown in FIG. 10, the power from the motor MG2 may be output to an axle (the axle connected to wheels 39c, 39d in FIG. 10) other than the axle (the axle connected to the drive wheels 39a, 39b) to which the ring gear shaft 32a is connected.

Figure 11:
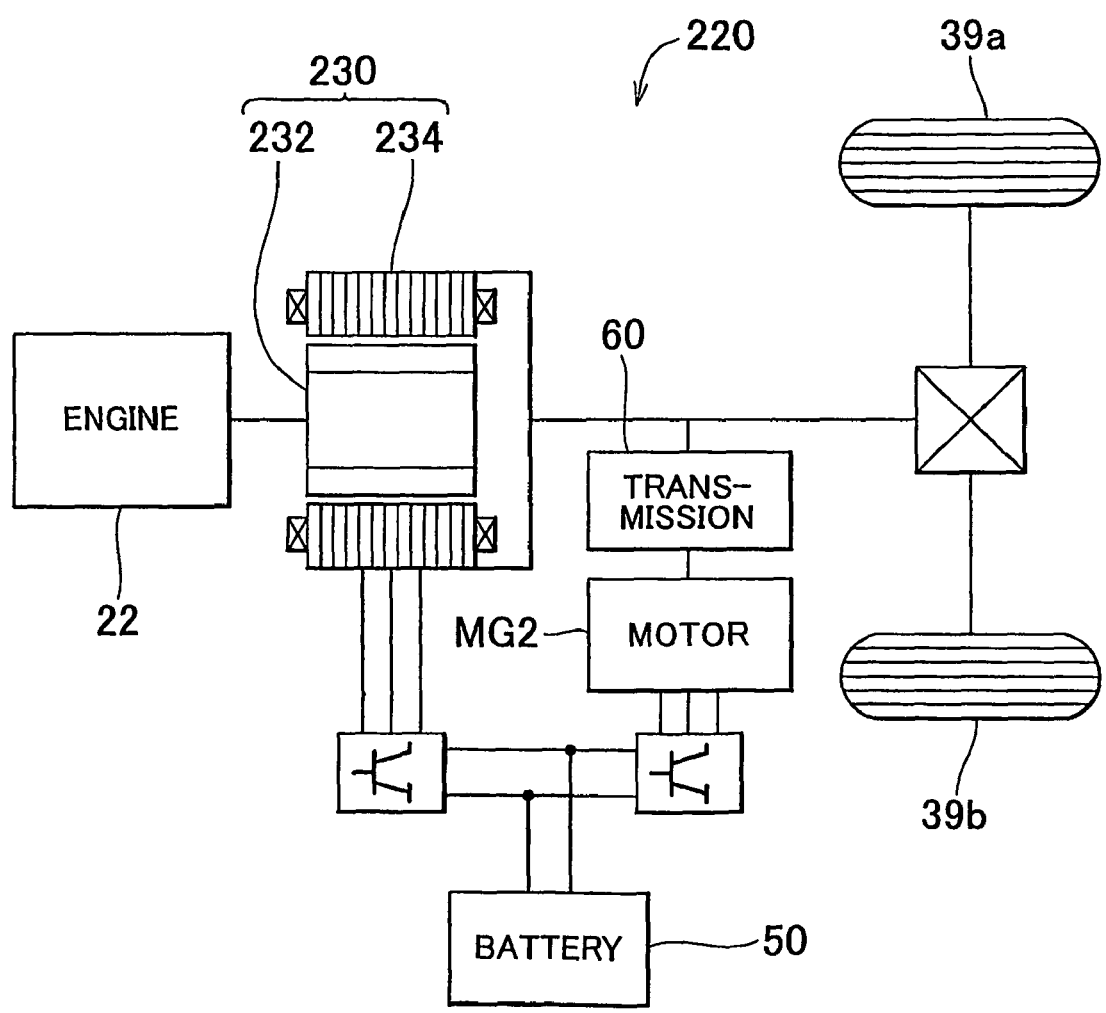
FIG. 11 is the view schematically showing the structure of a hybrid vehicle 220 according to another modified example of the embodiment of the invention.

In the hybrid vehicle 20 according to the embodiment described above, the power from the engine 22 is output, via the power split/integration mechanism 30, to the ring gear shaft 32a connected to the drive wheels 39a, 39b. Alternatively, as shown in a hybrid vehicle 220 according to another modified example of the embodiment of the invention shown in FIG. 11, a rotor electric motor 230 may be provided. The rotor electric motor 230 includes an inner rotor 232 connected to the crankshaft 26 of the engine 22 and an outer rotor 234 connected to the drive shaft that outputs the power to the drive wheels 39a, 39b. The rotor electric motor 230 outputs part of the power from the engine to the drive shaft and converts the remaining power to the electric power.

In the embodiment of the invention described above, the power output apparatus is mounted the hybrid vehicle. However, such power output apparatus may be mounted in movable bodies other than vehicles, such as vessels, and aircrafts, or immovable equipment such as construction equipment. Also, the invention may be applied to a power output apparatus, a control device for a power output apparatus, or a control method for a power output apparatus.

While the invention has been described with reference to an example embodiment thereof, it is to be understood that the invention is not limited to the example embodiment or constructions. To the contrary, the invention is intended to cover various modifications and equivalent arrangements. In addition, while the various elements of the example embodiment are shown in various combinations and configurations, which are exemplary, other combinations and configurations, including more, less or only a single element, are also within the spirit and scope of the invention.

The invention claimed is:

1. A power output apparatus that outputs power to a drive shaft, comprising:
    an internal combustion engine;
    a storage portion;
    an electric motor that receives and outputs power, and that exchanges electric power with the storage portion;
    a power split device that is connected to an output shaft of the internal combustion engine and the drive shaft, and that receives power from the output shaft and outputs the power to the drive shaft or receives power from the drive shaft and outputs the power to the output shaft while exchanging electric power with the storage portion and exchanging power with the internal combustion engine;
    a shifting portion that transfers power between a rotating shaft of the electric motor and the drive shaft while changing a speed ratio based on a rotational speed of the rotating shaft of the electric motor and a rotational speed of the drive shaft;
    a drive shaft rotational speed detection portion that detects the rotational speed of the drive shaft;
    a rotating shaft rotational speed detection portion that detects the rotational speed of the rotating shaft of the electric motor;
    a required drive power setting portion that sets a required drive power required for the drive shaft; and
    a control portion that controls the internal combustion engine, the power split device, the electric motor, and the shifting portion, wherein
    when there is no malfunction in either the drive shaft rotational speed detection portion or the rotating shaft rotational speed detection portion, the control portion changes the speed ratio in the shifting portion and performs an intermittent operation of the internal combustion engine so that a drive power corresponding to the required drive power is output to the drive shaft, and
    when a malfunction occurs in at least one of the drive shaft rotational speed detection portion and the rotating shaft rotational speed detection portion, the control portion limits at least one of the change in the speed ratio in the shifting portion, the intermittent operation of the internal combustion engine, and the output of the required drive power to the drive shaft so that a drive power that approximates the required drive power as closely as possible is output to the drive shaft.

2. A control unit for a power output apparatus that includes an internal combustion engine; a storage portion; an electric motor that receives and outputs power, and that exchanges electric power with the storage portion; a power split device that is connected to an output shaft of the internal combustion engine and a drive shaft, and that receives power from the output shaft and outputs the power to the drive shaft or receives power from the drive shaft and outputs the power to the output shaft while exchanging electric power with the storage portion and exchanging power with the internal combustion engine; a shifting portion that transfers power between a rotating shaft of the electric motor and the drive shaft while changing a speed ratio based on a rotational speed of the rotating shaft of the electric motor and a rotational speed of the drive shaft; a drive shaft rotational speed detection portion that detects the rotational speed of the drive shaft; and a rotating shaft rotational speed detection portion that detects the rotational speed of the rotating shaft of the electric motor, comprising:
    a required drive power setting portion that sets a required drive power required for the drive shaft; and a control portion that controls the internal combustion engine, the power split device, the electric motor, and the shifting portion, wherein when there is no malfunction in either the drive shaft rotational speed detection portion or the rotating shaft rotational speed detection portion, the control portion changes the speed ratio in the shifting portion and performs an intermittent operation of the internal combustion engine so that a drive power corresponding to the required drive power is output to the drive shaft, and when a malfunction occurs in at least one of the drive shaft rotational speed detection portion and the rotating shaft rotational speed detection portion, the control portion limits at least one of the change in the speed ratio in the shifting portion, the intermittent operation of the internal combustion engine, and the output of the required drive power to the drive shaft so that a drive power that approximates the required drive power as closely as possible is output to the drive shaft.

3. A control method for a power output apparatus that includes an internal combustion engine; a storage portion; an electric motor that receives and outputs power, and that exchanges electric power with the storage portion; a power split device that is connected to an output shaft of the internal combustion engine and a drive shaft, and that receives power from the output shaft and outputs the power to the drive shaft or receives power from the drive shaft and outputs the power to the output shaft while exchanging electric power with the storage portion and exchanging power with the internal combustion engine; a shifting portion that transfers power between a rotating shaft of the electric motor and the drive shaft while changing a speed ratio based on a rotational speed of the rotating shaft of the electric motor and a rotational speed of the drive shaft; a drive shaft rotational speed detection portion that detects the rotational speed of the drive shaft; and a rotating shaft rotational speed detection portion that detects the rotational speed of the rotating shaft of the electric motor, comprising:

controlling the internal combustion engine, the power split device, the electric motor, and the shifting portion, and, when there is no malfunction in either the drive shaft rotational speed detection portion or the rotating shaft rotational speed detection portion, changing the speed ratio in the shifting portion and performing an intermittent operation of the internal combustion engine so that a drive power corresponding to the required drive power is output to the drive shaft, and, when a malfunction occurs in at least one of the drive shaft rotational speed detection portion and the rotating shaft rotational speed detection portion, limiting at least one of the change in the speed ratio in the shifting portion, the intermittent operation of the internal combustion engine, and the output of the required drive power to the drive shaft so that a drive power that approximates the required drive power as closely as possible is output to the drive shaft.

4. A vehicle provided with the power output apparatus according to claim 1, wherein
an axle is connected to the drive shaft.

5. The power output apparatus according to claim 1, wherein,
when a malfunction occurs in the drive shaft rotational speed detection portion and the drive shaft rotational speed detection portion cannot detect the rotational speed of the drive shaft properly, the control portion determines that a malfunction occurs and performs control.

6. The power output apparatus according to claim 1, wherein,
when a malfunction occurs, the control portion performs control so that the speed ratio in the shifting portion is not changed.

7. The power output apparatus according to claim 1, wherein,
when a malfunction occurs, the control portion performs control so that the intermittent operation of the internal combustion engine is not performed.

8. The power output apparatus according to claim 1, wherein,
when a malfunction occurs, the control portion limits the drive power output from the electric motor.

9. The power output apparatus according to claim 1, wherein
the power split device includes a three-axis power reception/output means device that is connected to three shafts which are the output shaft of the internal combustion engine, the drive shaft, and a third shaft, and that receives or outputs, based on power received from or output to any two of the three shafts, power from or to the remaining shaft; and an electric motor that receives power from and output power to the third shaft.

* * * * *